US011312610B2

(12) United States Patent
Rudick et al.

(10) Patent No.: US 11,312,610 B2
(45) Date of Patent: Apr. 26, 2022

(54) SYSTEM AND METHOD FOR CHOOSING AND POURING BEVERAGES

(71) Applicant: The Coca-Cola Company, Atlanta, GA (US)

(72) Inventors: Arthur G. Rudick, Atlanta, GA (US); Rabab Saqib Karori, Atlanta, GA (US); John Boyd, Atlanta, GA (US); Keith A. Gibson, Atlanta, GA (US); Damian J. Mycroft, Atlanta, GA (US); Scott Cuppari, Atlanta, GA (US); David Mulcahey, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 203 days.

(21) Appl. No.: 16/526,720

(22) Filed: Jul. 30, 2019

(65) Prior Publication Data
US 2020/0031656 A1 Jan. 30, 2020

Related U.S. Application Data

(60) Provisional application No. 62/712,056, filed on Jul. 30, 2018.

(51) Int. Cl.
*G07F 13/06* (2006.01)
*B67D 1/08* (2006.01)
*G07F 9/00* (2006.01)

(52) U.S. Cl.
CPC ........... *B67D 1/0888* (2013.01); *G07F 9/001* (2020.05); *G07F 13/065* (2013.01); *B67D 2210/00089* (2013.01)

(58) Field of Classification Search
CPC ........ G07F 9/001; G07F 13/065; G07F 13/06; B67D 2210/00089; B67D 1/0888

USPC .................................................. 700/231–244
See application file for complete search history.

(56) References Cited

U.S. PATENT DOCUMENTS

| 9,898,884 | B1* | 2/2018 | Arora | G06Q 30/0226 |
|---|---|---|---|---|
| 11,059,713 | B1* | 7/2021 | Connor | G06Q 20/202 |
| 2011/0049180 | A1* | 3/2011 | Carpenter | B67D 1/0051 222/1 |
| 2012/0029691 | A1* | 2/2012 | Mockus | G06Q 20/3224 700/232 |
| 2012/0253993 | A1 | 10/2012 | Yoakim et al. | |

(Continued)

FOREIGN PATENT DOCUMENTS

| KR | 10-2014-0125090 A | 10/2014 |
|---|---|---|
| WO | 2018/071685 A1 | 4/2018 |
| WO | 2019/246413 A1 | 12/2019 |

OTHER PUBLICATIONS

Conrad, Alex. "Chili's To Install Tablets At Every Table: More Tips But A Cloudier Future For Servers." Forbes. Sep. 17, 2013. https://www.forbes.com/sites/alexkonrad/2013/09/17/chilis-to-install-tablets-at-every-table/#3f9784357ad3.

*Primary Examiner* — Timothy R Waggoner
(74) *Attorney, Agent, or Firm* — Meunier Carlin & Curfman LLC

(57) ABSTRACT

A beverage dispenser and method for operating a beverage dispenser may include receiving a handshake request from a mobile device of a user. A communications link may be established with the mobile device. Responsive to receiving control data associated with a beverage order from the mobile device, a physical function may be caused to be performed by the beverage dispenser.

20 Claims, 17 Drawing Sheets

(56) References Cited

U.S. PATENT DOCUMENTS

| | | | |
|---|---|---|---|
| 2012/0258216 A1* | 10/2012 | Wessels | A47J 31/44 426/231 |
| 2013/0096715 A1 | 4/2013 | Chung et al. | |
| 2013/0106690 A1* | 5/2013 | Lim | G07F 13/065 345/156 |
| 2015/0046877 A1* | 2/2015 | Cuppari | G06Q 20/322 715/834 |
| 2015/0082243 A1* | 3/2015 | Taylor | G07F 9/002 715/814 |
| 2015/0195334 A1* | 7/2015 | Chew | H04W 4/80 705/40 |
| 2016/0275760 A1* | 9/2016 | Block | G06Q 20/1085 |
| 2017/0186110 A1 | 6/2017 | Carpenter et al. | |
| 2018/0072557 A1* | 3/2018 | Bertness | B01F 13/1066 |
| 2020/0017345 A1* | 1/2020 | Karibandi, Jr. | G06F 3/04817 |
| 2020/0184531 A1* | 6/2020 | Yen | G06Q 30/0623 |

* cited by examiner

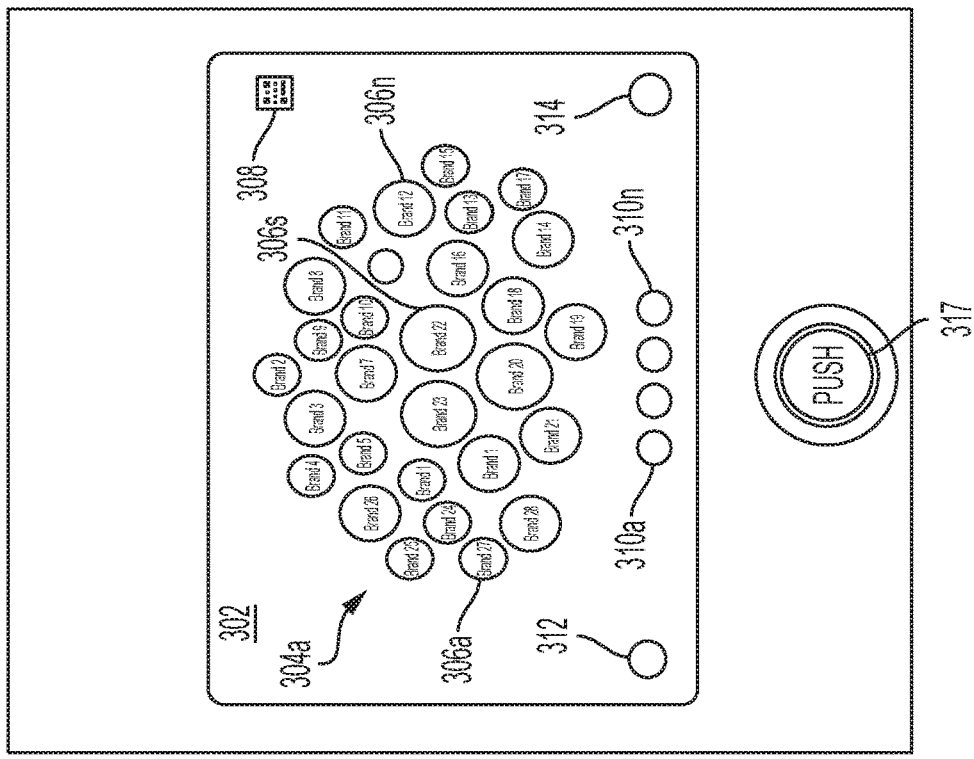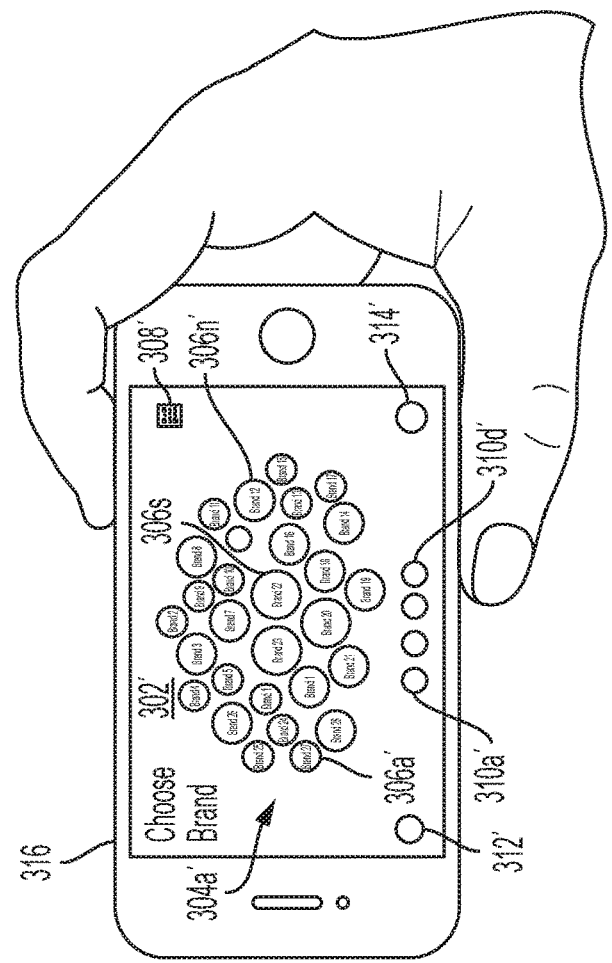
FIG. 3A

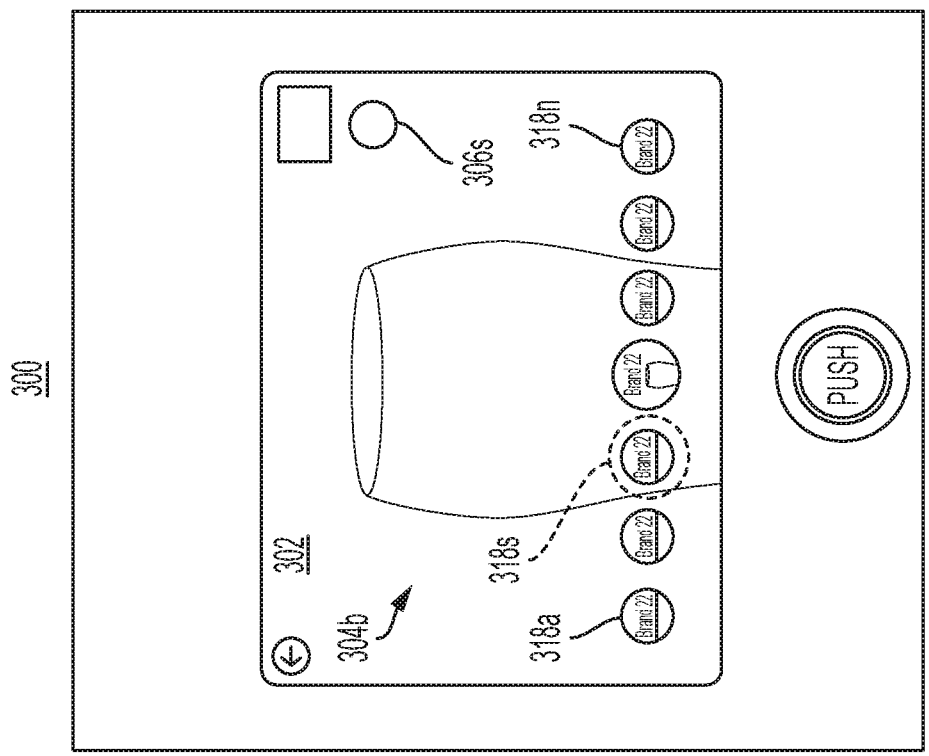
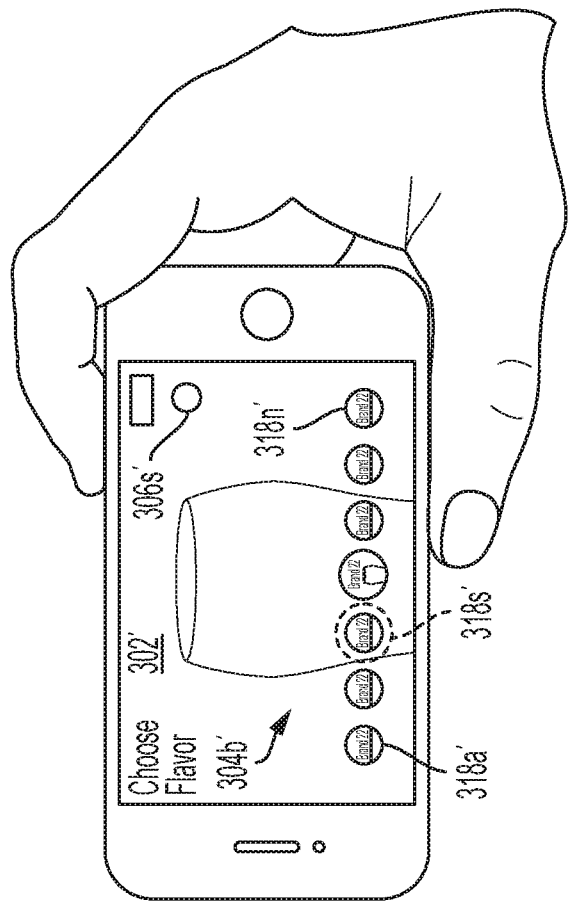
FIG. 3B

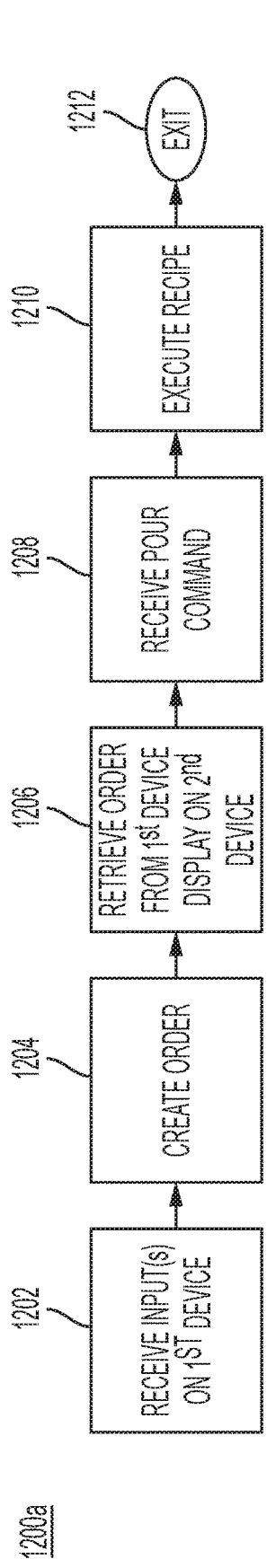
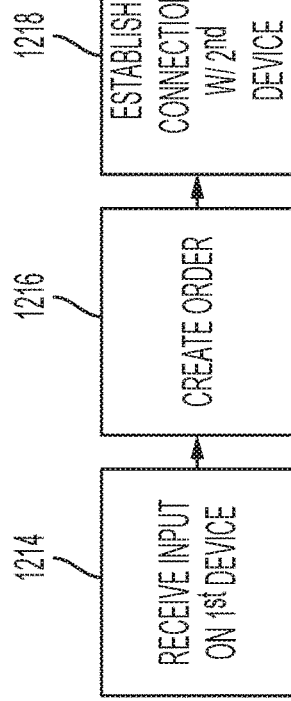
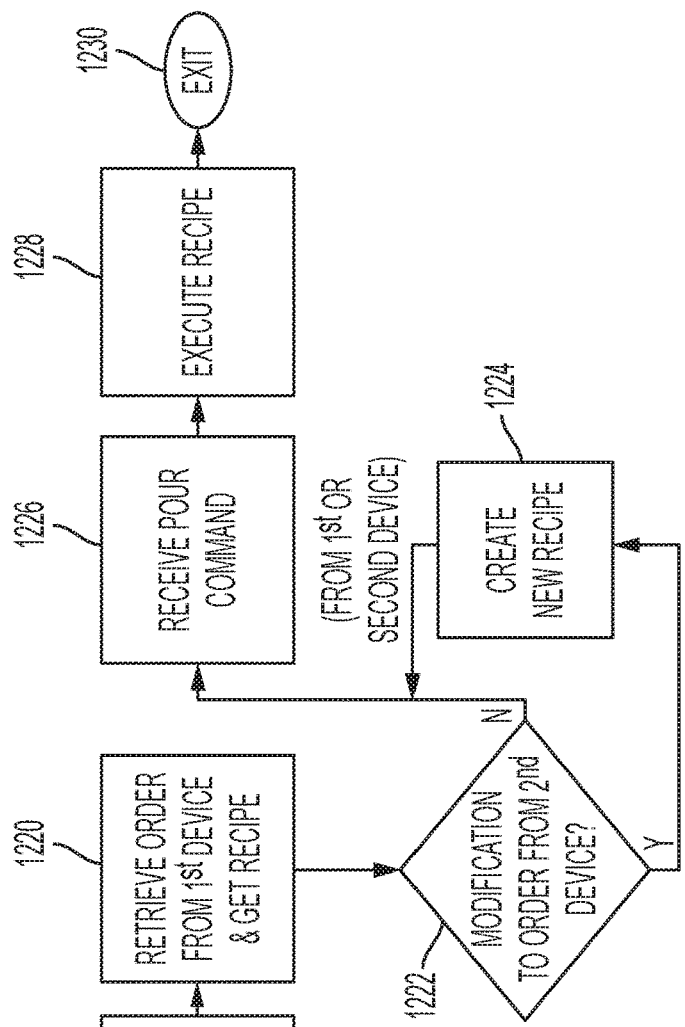
FIG. 12A
FIG. 12B

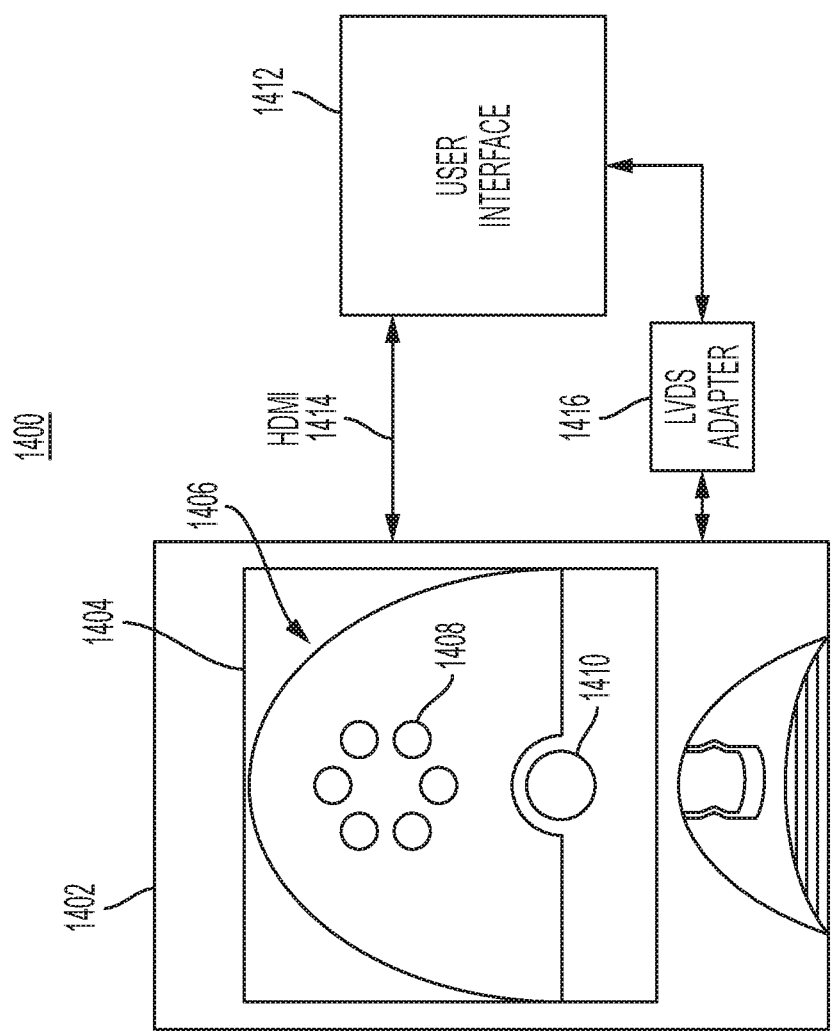

SYSTEM AND METHOD FOR CHOOSING AND POURING BEVERAGES

CROSS-REFERENCE TO RELATED APPLICATIONS

This application claims the benefit of priority to U.S. Provisional Application No. 62/712,056, filed Jul. 30, 2018, the disclosure of which is incorporated herein by reference in its entirety.

BACKGROUND OF THE INVENTION

Beverage dispensers have become highly evolved over the years. Where beverage dispensers were once limited to a few number of ingredients, such as four to eight different ingredients, these days advanced dispensers may be configured with over 30 ingredients, and are capable of dispensing over 100 different beverages and nearly an infinite number of blends for users to create using the ingredients.

Today's advanced beverage dispensers are able to communicate with mobile electronic devices (e.g., smartphones) of users. Such communications may provide for communicating beverage order data, such as beverage brand, ingredients, size, user ID and/or other data that may be used for a user or food outlet operator to manually dispense a requested beverage. Communications from the mobile electronic device may be direct (e.g., via a local wireless communications channel) or indirect (e.g., via a remote server). Communications capabilities, however, are relatively limited and provide relatively limited functionality. As an example, communications capabilities between mobile devices and dispensers are limited to the communication of beverage orders from mobile devices to a dispenser so that a user may thereafter dispense a custom-designed beverage pursuant to the order.

Another problem that exists with beverage dispensers is the dispensers tend to have limited throughput as a result of users having to make beverage selections via a single user interface on the dispenser. As a result, queues form at the dispensers during heavy traffic periods and negatively impact users and reduce beverage consumption.

SUMMARY OF THE INVENTION

To further advance beverage dispensers and provide for additional consumer acceptance through providing a more integrated user interface, a mobile app or other user interface may be provided to a user via a mobile electronic device or mobile device that enables advanced communication with and functionality of the dispenser. For example, a mobile app may be configured to control operations of a beverage dispenser (e.g., control a cursor), perform advanced user interactions with the beverage dispenser (e.g., flick a beverage selection from a mobile device user interface to a dispenser user interface), replicate the user interface of the beverage dispenser on the mobile device, perform advanced sensing (e.g., track eye motion), use voice recognition other sensory (e.g., visual) gesture recognition to allow for users with impairments to more easily utilize a dispenser, and/or use other form of user interaction via a mobile device to interface with dispenser. In an embodiment, once a mobile device of a user engages in communications with the dispenser, other mobile devices may be prevented from simultaneously controlling the dispenser, although queuing requests may be performed, until the user has completed a transaction (e.g., pouring a selected beverage).

So as to minimize queues, an embodiment of the dispenser may be configured to receive, store, and display multiple beverage orders for selection thereof by respective users or operators for dispensing a selected beverage. In an embodiment, one or more tablets or other user interfaces that may support the same or different user interface as the dispenser may be positioned proximate the dispenser so as to enable users to select a beverage for dispensing by the dispenser.

To stay relevant and interesting to consumers, beverage dispensers that have unique and interesting functionality may be provided. As examples, displays in the form of decorative plastic cover that are capable of operating as user interfaces with trademarks and logos being displayed on the plastic cover via rear projection when not used may be provided. Multiple interactive displays that are user interactive between the two displays (e.g., user swipes a logo from a beverage selection touchscreen display to a pour touchscreen display may be provided on the beverage dispenser. In such a configuration, once a selection is made and a graphic moves from the beverage selection touchscreen display to the pour touchscreen display, the dispenser enables operational control and command execution to be performed.

In yet another embodiment, a virtual and/or augmented reality configuration may allow for a user to interface with a mobile device with a camera that is in communication with the dispenser, and in control with at least one physical function of the dispenser. As an example, the user may point the camera of the mobile device at the dispenser such that the mobile device displays the dispenser on a display of the mobile device. Thereafter, the user may be able to interact with the image of the dispenser being displayed on the mobile device, and the interactions may be identified by the mobile device and communicated to the dispenser so as to cause the dispenser to perform functions as if the user is physically engaging with the dispenser. As an example, the user may swipe or touch an icon on the mobile device that is being displayed on the dispenser and the display of the dispenser may respond as if the user is swiping or touching an icon directly on the display of the dispenser. If the user thereafter presses a "pour" button (e.g., soft- or hard-button), then the dispenser may perform a pour function to pour a selected beverage. Alternative scenarios are also possible, such as selecting and "flicking" a beverage icon onto the dispenser to cause the dispenser to display the "flicked" beverage icon. Using such a scenario, it is possible for multiple (e.g., two or more) user interfaces to provide the user with selection and dispensing control of a dispenser. It should be understood that selectable images other than beverage icons may be available for a user to select to interface with and control the beverage icon.

One embodiment of a beverage dispenser may include a non-transitory memory configured to store user control data. An input/output (I/O) unit may be configured to communicate over a communications network with a mobile device. A processing unit may be in communication with the memory and I/O unit, and be configured to receive, via the communications network, a handshake request from the mobile device. A communications link may be established with the mobile device. Responsive to receiving control data associated with a beverage order from the mobile device, a physical function may be caused to be performed by the dispenser.

One embodiment of a method for operating a beverage dispenser may include receiving a handshake request from a mobile device of a user. A communications link may be established with the mobile device. Responsive to receiving control data associated with a beverage order from the mobile device, a physical function may be caused to be performed by the beverage dispenser.

BRIEF DESCRIPTION OF THE DRAWINGS

Illustrative embodiments of the present invention are described in detail below with reference to the attached drawing figures, which are incorporated by reference herein and wherein:

FIGS. 3A and 3B, illustrations of an illustrative dispenser including electronic display and mobile device of a user;

FIG. 12A is an illustration of an illustrative process for an electronic device and a beverage dispenser to collect and dispense a drink order;

FIG. 12B is a flow diagram of an illustrative process for receiving and dispensing an order;

FIG. 14 is an illustration of an illustrative beverage dispenser arrangement including a beverage dispenser configured to dispense beverages;

DETAILED DESCRIPTION OF THE INVENTION

Figure 1:
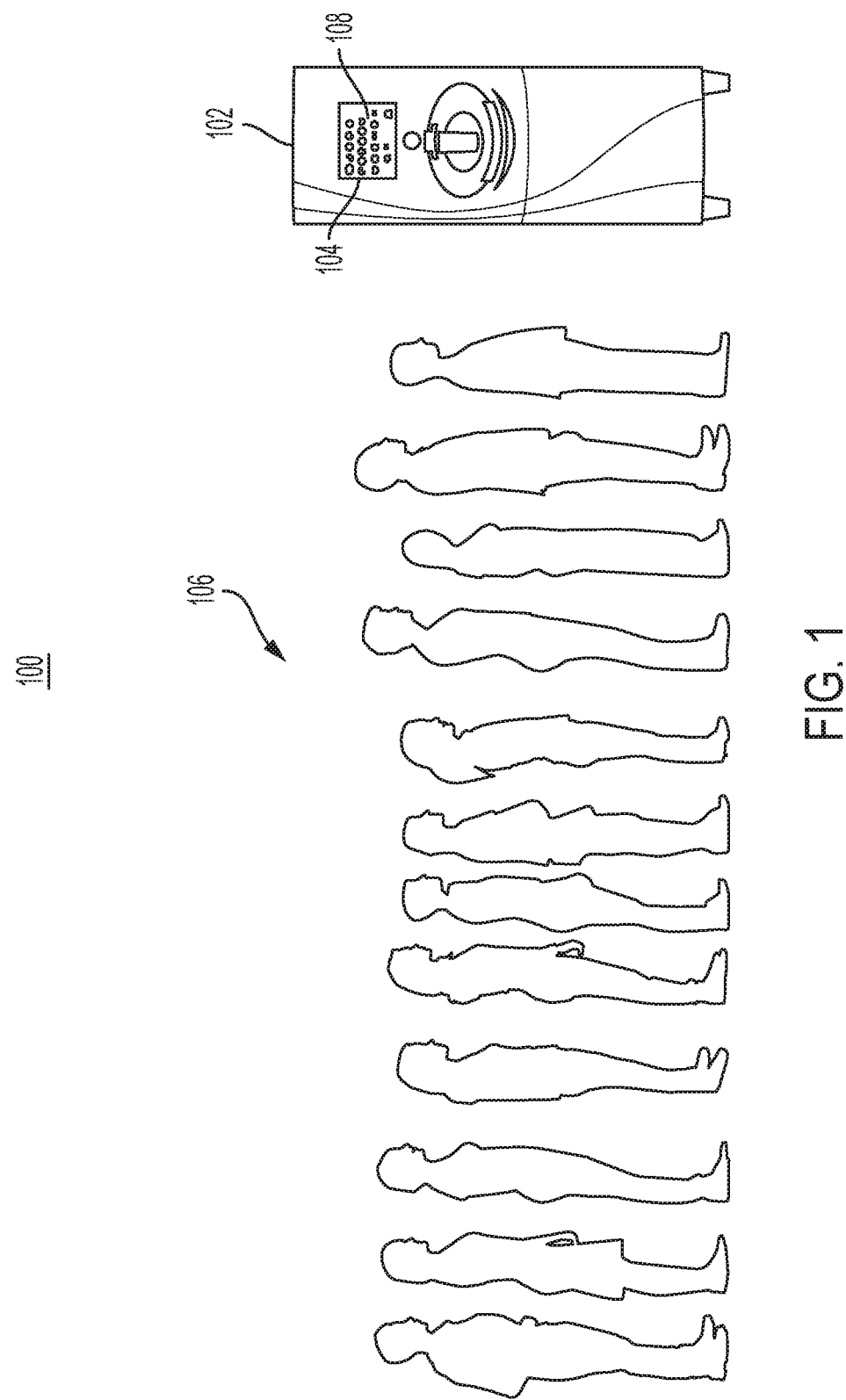
FIG. 1 is an illustration of an illustrative beverage dispenser environment at which a beverage dispenser is available with a line or queue of customers waiting for access to the beverage dispenser.

With regard to FIG. 1, an illustration of an illustrative beverage dispenser environment 100 at which beverage dispenser 102 with an electronic display 104 is available with a line or queue 106 of customers is formed to wait for access to the beverage dispenser 102 is shown. The beverage dispenser 102 is shown to include an electronic display 104, in this case a touch-sensitive electronic display, that displays a graphical user interface 108 with which users interface to operate the dispenser 102. As understood, the queue 104 often results from users having to make decisions at the user interface 108 on the dispenser 102 in a real-time manner. Beverage dispensers have become highly evolved over the years. Where beverage dispensers were once limited to a few number of ingredients, such as four to eight different ingredients, these days advanced dispensers may be configured with over 30 ingredients that are capable of dispensing over 100 different beverages and nearly an infinite number of blends for users to create using the ingredients. As a result, potential for a queue 106 to be formed at the dispenser is higher for the dispenser 102 than historical beverage dispensers with more limited selections. As a result of the queue 106, alternative technical solutions to reduce queue size and increase throughput by the dispenser are provided hereinafter.

Figure 2:
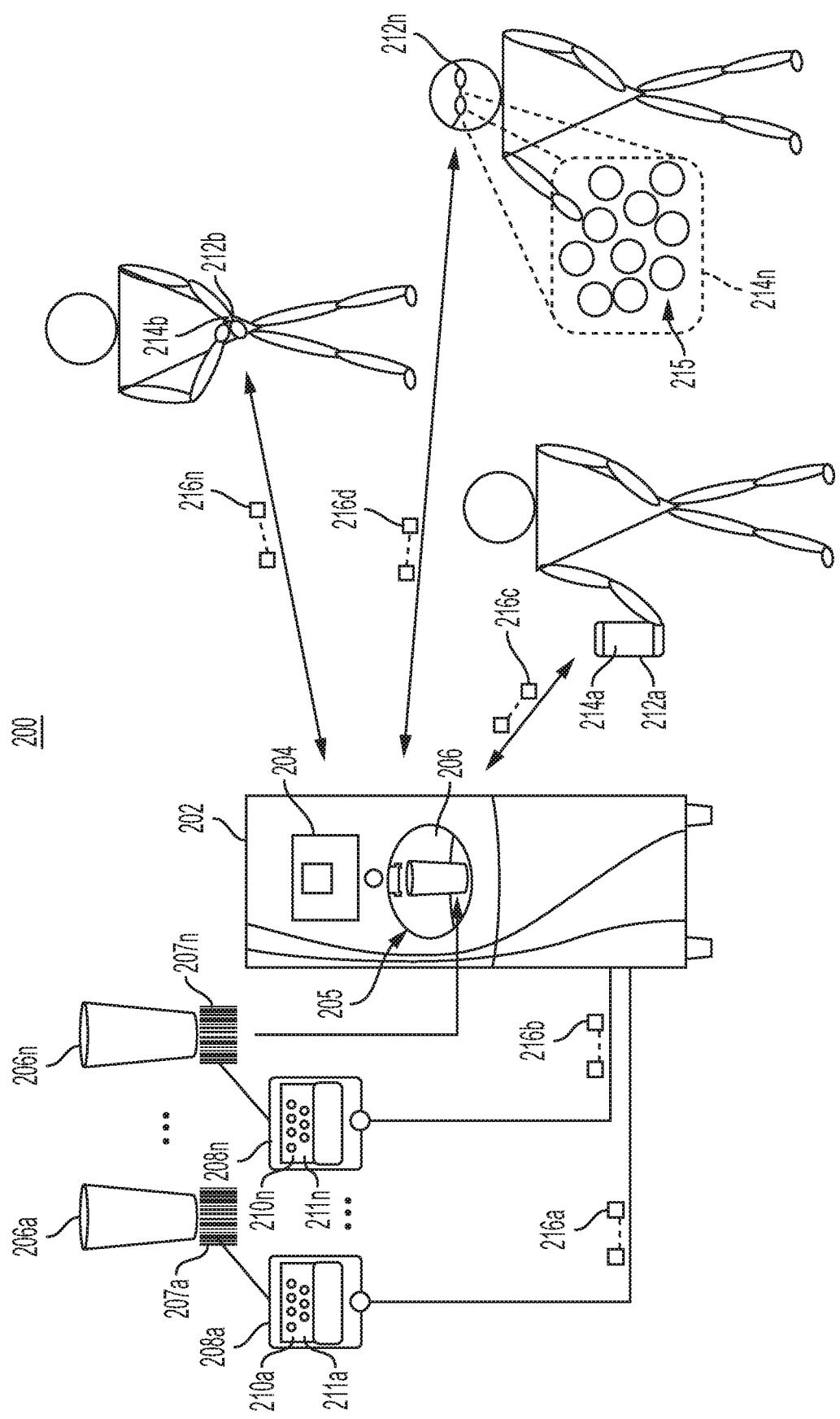
FIG. 2 is an illustration of an illustrative beverage dispenser at which electronic devices, including stationary and mobile devices, may be used by users to order beverages and initiate physical actions to be performed by the beverage dispenser.

With regard to FIG. 2, an illustration of an illustrative environment 200 in which an illustrative beverage dispenser 202 including an electronic display 204 for users to control operation of the dispenser 202 is shown. The dispenser 202 may include a fill region 205 in which cups 206a-206n (collectively 206) may be placed for filling with a beverage composed of one or more ingredients. The cups 206 may respectively include barcodes 207a-207n (collectively 207) that may be read by a barcode reader (not specifically shown) so as to identify a respective cup 206 associated with a user. One or more remote electronic devices 208a-208n (collectively 208) may be in communication with the dispenser 202, and be configured with electronic displays 210a-210n (collectively 210) that may be used by users to order beverages and initiate physical actions to be performed by the beverage dispenser. The electronic devices 208 may be wire or wirelessly connected to the dispenser 202. The electronic devices 208 may be mounted to a wall and/or side of the dispenser, positioned on a table of a restaurant, or disposed anywhere in relation to the dispenser 202. On the electronic displays 210 may be user interfaces 211a-211n (collectively 211) that may be the same or similar user interface that may be displayed on the electronic display 204 of the dispenser 202. The user interfaces 211 may display available beverages, ingredients, and/or flavors for selection by users to order beverages to be dispensed by the dispenser 202, as further described herein.

In addition to the remote electronic devices 210, user-owned electronic devices 212a-212n (collectively 212) may be utilized to wirelessly interface and communicate with the dispenser 202. The electronic devices 212 may include a smartphone or personal digital assistant 212a, smart watch 212b, and virtual glasses 212n. Other electronic devices that may communicate with the dispenser 202 may be utilized. In operation, the electronic devices 212 may use a local wireless communications protocol, such as Wi-Fi®, Bluetooth®, or any other local wireless communications protocol to communicate with the dispenser 202. Alternatively, the electronic devices 212 may communicate with the dispenser 202 via a wide area network, such as a mobile communications network and/or the Internet. In an embodiment, the dispenser 202 may display or have affixed thereto a machine readable indicia, such as a QR code or barcode, that may be scanned by the electronic devices 212 to cause the electronic devices to open a mobile browser that interfaces with a remote server (not shown) in communication with the dispenser 202 or directly with the dispenser 202 itself via a long distance or local wireless channel. User interfaces 214a-214n (collectively 214) may replicate a user interface of the dispenser 202 or be designed to fit the technology available on each of the types of electronic devices 212. The user wearing the virtual glasses 202n may select from virtual indicia 215 to select a desired beverage brand and/or other ingredients. In an embodiment, the electronic devices 212 may be configured to track eye movement for performing functions on the UIs 214.

In operation, each of the electronic devices 210 and 212 may communicate wireless communications signals 216a-216n (collectively 216) may be communicated between the dispenser 202 and wirelessly connected electronic devices 210 and 212. The wireless communications signals 216 may include data used to enable a user to select selections (e.g., beverage, ingredients, flavors, mix percentages, etc.) for dispensing a beverage by the dispenser 202. The data may include any data used for display and selection on the electronic devices 210 and 212 and/or display and/or control of the dispenser 202 for queuing and/or dispensing by the dispenser 202. In an embodiment, the data may include identification data associated with the user (e.g., user name, image, avatar, photograph, etc.) for storage and display on the electronic device 204 of the dispenser 202 so that the user or store operator, may readily identify and select a selected beverage to be poured by the dispenser 202 for the user.

With regard to FIGS. 3A and 3B, illustrations of an illustrative dispenser 300 including electronic display 302 and a mobile device 316 of a user both displaying a common user interface 304a and 304b are shown. The electronic display 302 includes a user interface 304a that shows selectable icons 306a-306n (collectively 306) for a user to select available brands of a beverage to be dispensed by the dispenser 300. A machine readable indicia 308 (e.g., quick reference (QR) code) may be displayed for the electronic device 316 to image or scan for registration and/or to establish communications with the dispenser 300. Selectable control elements 310a-310n (collectively 310) may be used to move through or select from a number of control screens for selecting and pouring a beverage. A "water" soft-button 312 may be available for a user to select water as a beverage to be dispensed by the dispenser 300. An available mix soft-button 314, such as "LeBron's mix" soft-button (or display element), may be available for a user to select a pre-set mix of brands, ingredients, and/or flavors by another user of the electronic device 316 may be displayed. As shown, a user has selected a brand by touching selectable icon 306s.

On the mobile electronic device 316, an electronic display 302' may display a complementary user interface 304a' thereon. Each of the selectable elements that are displayed on the user interface 302 of the dispenser 300 may also be displayed for a user to select a beverage to be dispensed by the dispenser 300. As previously described with regard to FIG. 2, the mobile electronic device 316 may communicate with the dispenser 300 via a local or long-range wireless communications protocol. As shown, the selectable icon 306s' has been selected, and such a selection may be displayed on the electronic display 302 in response to a communication from the electronic device 316 to the dispenser 300. In an embodiment, the icon 306 may dynamically in real-time show the icon 306' being selected (e.g., change color as the user touches the icon 306') by the electronic device 316 communicating signals to the dispenser 300. Other actions being performed on the user interface 304b' may be displayed on the user interface 304b'. A push-button 317 may enable the user to dispense a selected beverage by the dispenser 300. In an alternative embodiment, a soft-button may be available for pressing on the electronic display 302 to cause the selected beverage to be dispensed by the dispenser 300.

With regard to FIG. 3B, the dispenser 300 is shown to include a different user interface 304 of the electronic display 302. User interface 304b may display an icon 306s of the selected brand from the previous user interface 304a along with selectable icons 318a-318n (collectively 318) representative of different flavors of the selected brand displayed by the icon 306s. As shown, a user may select one of the selectable icons 318s, such as "Sprite Peach" selectable icon, to select a particular flavor of the brand. As previously described, a user may operate the user interface 302', which causes corresponding actions to be displayed in real-time on the user interface 302. For example, in response to the user touching a selectable icon 318', a corresponding one of the icons 318 on the user interface 302 may appear to be selected simultaneously. Moreover, if the user performs a virtual reality action on the user interface 302', then a corresponding virtual reality action may be performed on the user interface 302'. For example, if the user "flicks" a virtual ball or beverage can toward the dispenser 300, then the user interface 302 may provide for a corresponding virtual reality interface, such a displaying cups in which the ball or beverage can may be placed to place the beverage order, receive a reward, or otherwise.

Figure 4B:
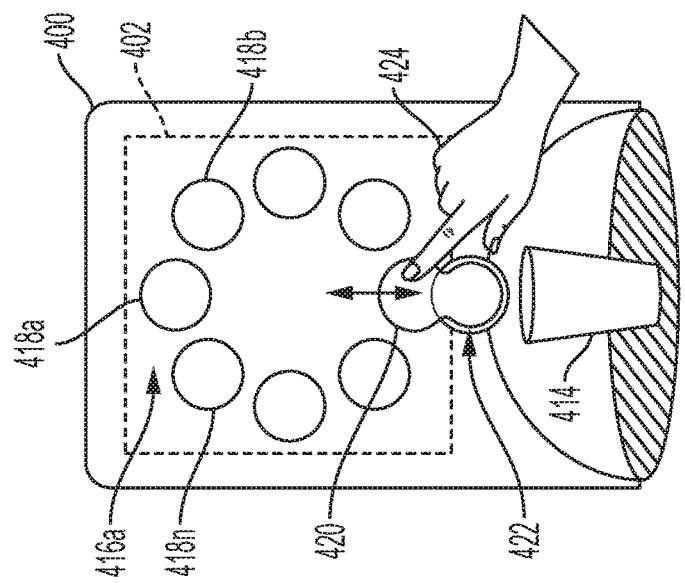
FIGS. 4A-4C are illustrations of a beverage dispenser including a schematic of electronics used to control the dispenser and user interface for enabling a user to interact with the dispenser in selecting and pouring beverages.
Figure 4C:
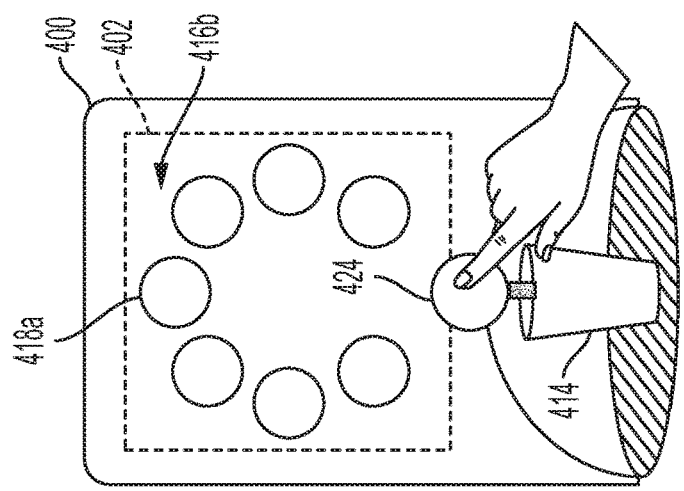
Figure 4A:
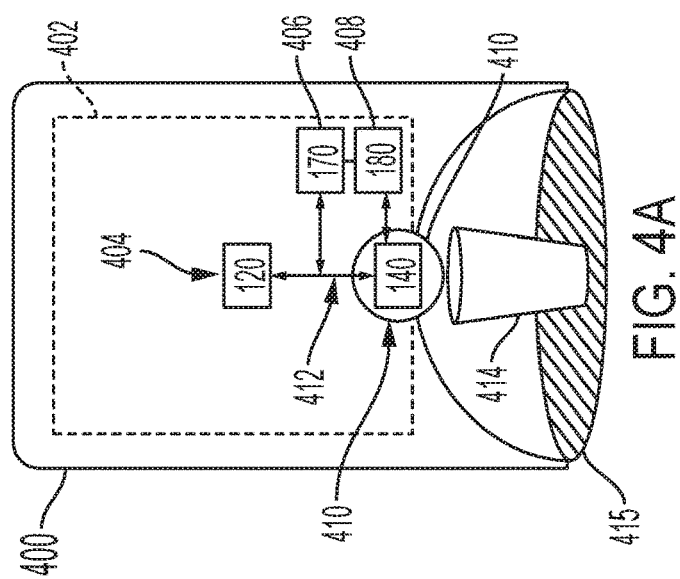

With regard to FIGS. 4A-4C, illustrations of a beverage dispenser 400 including a schematic of electronics used to control the dispenser and user interface that enables a user to interact with the dispenser to select and pour beverages are shown. The dispenser 400 may include an electronic display 402, such as a touch/gesture sensitive device with which a user may interact to select a beverage, as further described herein. The dispenser 400 may include a processing unit 404 that includes a general or application specific processor, display driver, graphics card, memory, and/or any other electronics, such as an input/output (I/O) device used to communicate wired or wirelessly remote from the dispenser 400, and/or control electromechanical devices of the dispenser 400. The communications may have sufficient bandwidth to enable real-time updates to a user interface being displayed by the dispenser 400 in response to a user interacting with a corresponding user interface on an electronic device, such as described with regard to FIGS. 3A and 3B. A storage unit 406, which may be any non-transitory storage medium (e.g., hard drive or solid-state memory device) may be configured to store one or more databases, such as a recipe database, that includes brands, ingredients, and/or flavors available to be dispensed by the dispenser 400.

The processing unit 404 may further be in communication with flow controls 408 configured to control pumps, valves, or other mechanism for dispensing fluid, such as micro or macro fluid ingredients, for mixing and/or pouring from a nozzle (not shown) of the dispenser 400. Another control device 410, such as a push-button, touch/gesture sensitive device, and/or otherwise may be configured to enable the user to dispense a selected beverage from the dispenser 400. In an embodiment, the processing unit 404 may be configured to control data displayed on the device 410 if the device 410 is an electronic display. In response to a user engaging with the device 410, the flow controls 408 may drive one or more pumps, valves, and/or otherwise to dispense the selected beverage. The electronics of the dispenser 400 may be configured to communicate over a communications bus 412, as understood in the art. A beverage cup 414 may be disposed in a dispensing region 415 for dispensing a beverage into the beverage cup 414.

With regard to FIG. 4B, the dispenser 400 is shown to include electronic display 402 on which a user interface 416a is displayed. The user interface 416a is shown to include a set of selectable icon regions 418a-418n (collectively 418). In an embodiment, the user may select any of the selectable icons 418 and drag the selected one of the icons 418 into a region 420 and thereafter into another electronic display 422. The processing unit 404 may receive the user input and coordinate animation or other movement of the icons in one or both of the electronic displays 402 and 422. Alternatively, a sub-region of the electronic display 402 may replicate the appearance of the electronic display 422, and a frame structure (not shown) may overlay the lower portion of the electronic display 402 so as to cause the sub-region to appear to be separate from the electronic display 402. In operation, a user may use his or her hand 424 and drag, swipe, "flick", or otherwise gesture one of the selectable icons 418 from the electronic display 402 toward or onto the electronic display 422. The user may thereafter engage with the electronic display 422 or push-button associated therewith, which may act as a beverage (i.e., a beverage associated with an icon being displayed by the electronic display 422) pour control device to cause the dispenser 400 to pour a selected beverage to a cup 414.

With regard to FIG. 4C, the dispenser 400 is shown to include an alternative user interface 416b in which a beverage pour mechanism 424 may not have the ability for an icon to be dragged or displayed thereon, but rather act as a conventional pushbutton to cause the selected beverage to be dispensed into the cup 414 by the dispenser 400.

Figure 5:
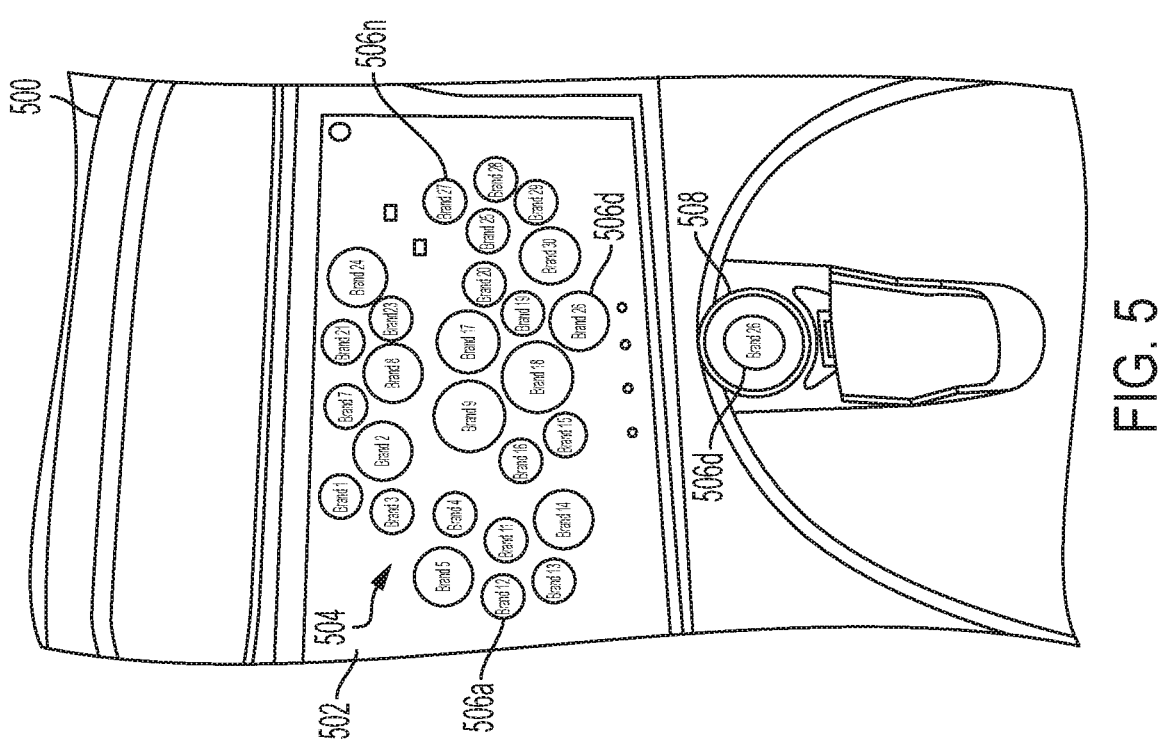
FIG. 5 is an illustration of another embodiment of a beverage dispenser inclusive of an electronic display, which may be touch or gesture sensitive, on which a user interface is displayed.

With regard to FIG. 5, an illustration of another embodiment of a beverage dispenser 500 inclusive of an electronic display 502, which may be touch or gesture sensitive, on which a user interface 504 is displayed is shown. The user interface 504 may include multiple icons 506a-506n (collectively 506) within circular regions. Another electronic display 508 may be displayed just above a nozzle (not shown) of the dispenser 500. In an embodiment, the dispenser 500 may be configured with one or more processors that are used to control the user interface 504 being displayed on the electronic display 502. The electronic display 502 may be touch-sensitive, such that when a user touches or drags one of the icons 506, such as icon 506d, to cause the icon to be displayed on the electronic display 508. In an embodiment, the electronic display 508 may be mounted onto a pushbutton such that a user may press the electronic display 508 to cause the selected beverage associated with the selected icon 506d being displayed on the electronic display 508 to be poured. In an alternative configuration, a controller may sense that a user touches the electronic display 508 and pour the beverage while the user continues touching the touch-sensitive electronic display 508. In the event that the user decides to select a different beverage to pour, the user may simply select another of the selectable icons 506 on the user interface 504. The user may drag, "flick," drop, or otherwise gesture the icon 506d being displayed on the electronic display 508 to clear the beverage currently selected before selecting another of the selectable icons 506.

Figure 6B:
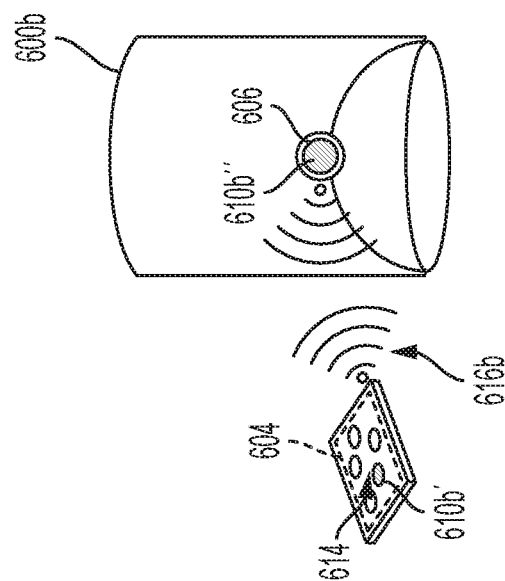
FIG. 6B is an alternative embodiment of a beverage dispenser that does not include an electronic display.
Figure 6A:
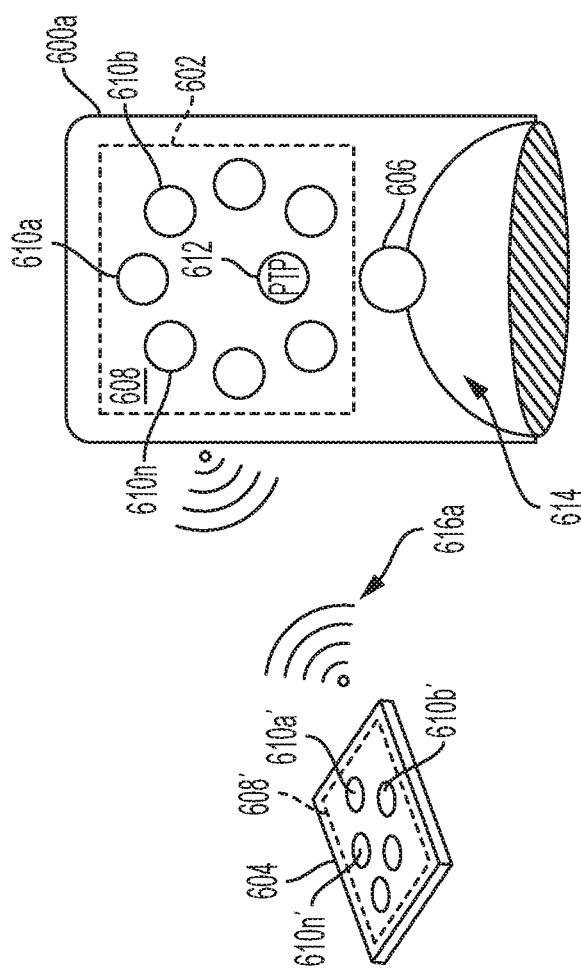
FIG. 6A is an illustration of an illustrative dispenser including an electronic display that wirelessly communicates with an electronic device that is touch/gesture sensitive.

With regard to FIG. 6A, an illustration of an illustrative dispenser 600a including an electronic display 602 that wirelessly communicates with an electronic device 604 that is touch/gesture sensitive is shown. Electronic device 604 may be a smartphone or any other electronic device, such as a tablet, that is located near the dispenser 600a (e.g., within a local wireless protocol communication distance). Electronic display 602 may include an electronic device 606 that is touch/gesture sensitive if no push-to-pour (PTP) capability is provided on a user interface 608 on the electronic display 602.

User interface 608 may include a set of selection elements 610a-610n (collectively 610) that may be used by a user to select from beverage brands, flavors, and/or other ingredients. In an embodiment, a PTP soft-button 612 may be included that enables the user to cause the dispenser 600a to pour a selected beverage into a vessel (e.g., cup) via a nozzle (not shown) within a dispenser area 614.

Electronic device 604 may provide the same, similar, or alternatively configured user interface 608' inclusive of the selection elements 610a'-610n' (collectively 610') that enables a user of the electronic device 604 to interface with the user interface 608' in the same or similar manner as with the user interface 608 on the dispenser 600a. The electronic device 604 may communicate wirelessly via a wireless communications signal 616a to communicate selections made on the user interface 608' to the dispenser 600a. The dispenser 600a may receive commands and data from the electronic device 604 and perform functions, such as setting up to dispense a selected beverage, as if the user were interfacing with the user interface 608 of the dispenser 600a. In response to a user interfacing with the user interface 608' of the electronic device 604, a physical action may be caused to occur on the dispenser 600a, where the physical action may be a change on the electronic display and/or electromechanical device(s) of the dispenser 600a. If, however, the electronic display 608 is being used by another customer, then the electronic display 608 may not be responsive to interactions on the electronic display 608'. By enabling electronic devices to provide for the same or comparable user interface as the dispenser 600a, a higher volume of users may dispense beverages from the dispenser 600a.

In an embodiment, data that is communicated wirelessly by the electronic device 604 to the dispenser 608 may include user and/or beverage identification for display on the electronic display 602. The dispenser 600a may be configured to support a queue operation so that multiple users may communicate beverage orders to the dispenser 600a, and enable the users to select from displayed queued orders of beverages from external electronic devices, such as electronic device 604, to dispense by the dispenser 600a thereafter at any time the dispenser 600a is available for a user to select an order and dispense an associated selected beverage. That is, the queue, which may include selected beverage data and user ID, for example, may be displayed on the dispenser 600a for selection by the respective users or by an operator of the dispenser 600a if behind a service counter. The wireless communications signal 616a may be communicated using any local wireless communications protocol (e.g., Bluetooth®, etc.) or any other wireless communications protocol via a wider network, such as a mobile communications network, Internet communications network, or otherwise. Rather than the wireless communications signal 616a being used to communicate directly to the dispenser 600a, the wireless communications signal 616a may be in communication with a local router or other network access point, mobile communications networks, or otherwise. In an embodiment, the communications between electronic device 604 and dispenser 600a may be in the form of a remote control (i.e., selections made at the electronic device 604 cause the dispenser 600a to respond in a real-time manner).

With regard to FIG. 6B, an alternative embodiment of a beverage dispenser 600b that does not include an electronic display is shown. In this embodiment, the electronic device 604 may be in communication with the dispenser 600b as with the dispenser 600a, and the only user interface would be available on a separate electronic device 604. Although only one electronic device 604 is shown, it should be understood that multiple electronic devices may be capable of serially or simultaneously communicating with the dispenser 600b. The electronic device 604 may take any of the forms described in FIG. 6A, such as being wall mountable, table or counter placed, otherwise positioned electronic device, or user-owned, such as a smartphone. The electronic display 606 may be configured to enable a user to see that his or her beverage selection was properly transmitted to the dispenser 600b by displaying the selected order or selection element (e.g., beverage brand logo) 610b". The electronic display 606 may support displaying selection element 610b" in response to a user selecting a corresponding selection element 610b' on the electronic device 604. Other graphics and/or information may also be displayed, such as a user identifier (e.g., user name, image, avatar, etc.), so that the user and other users know whose beverage is ready to be dispensed. In an embodiment, the dispenser 600b may be configured to support a queue, but with the limited size of the electronic display 606, only one selection element 610b" may be displayed at a time. The electronic display 606 may be part of or associated with a push button or other activation element to enable the user to press to cause the dispenser 600b to dispense a selected beverage.

Figure 7:
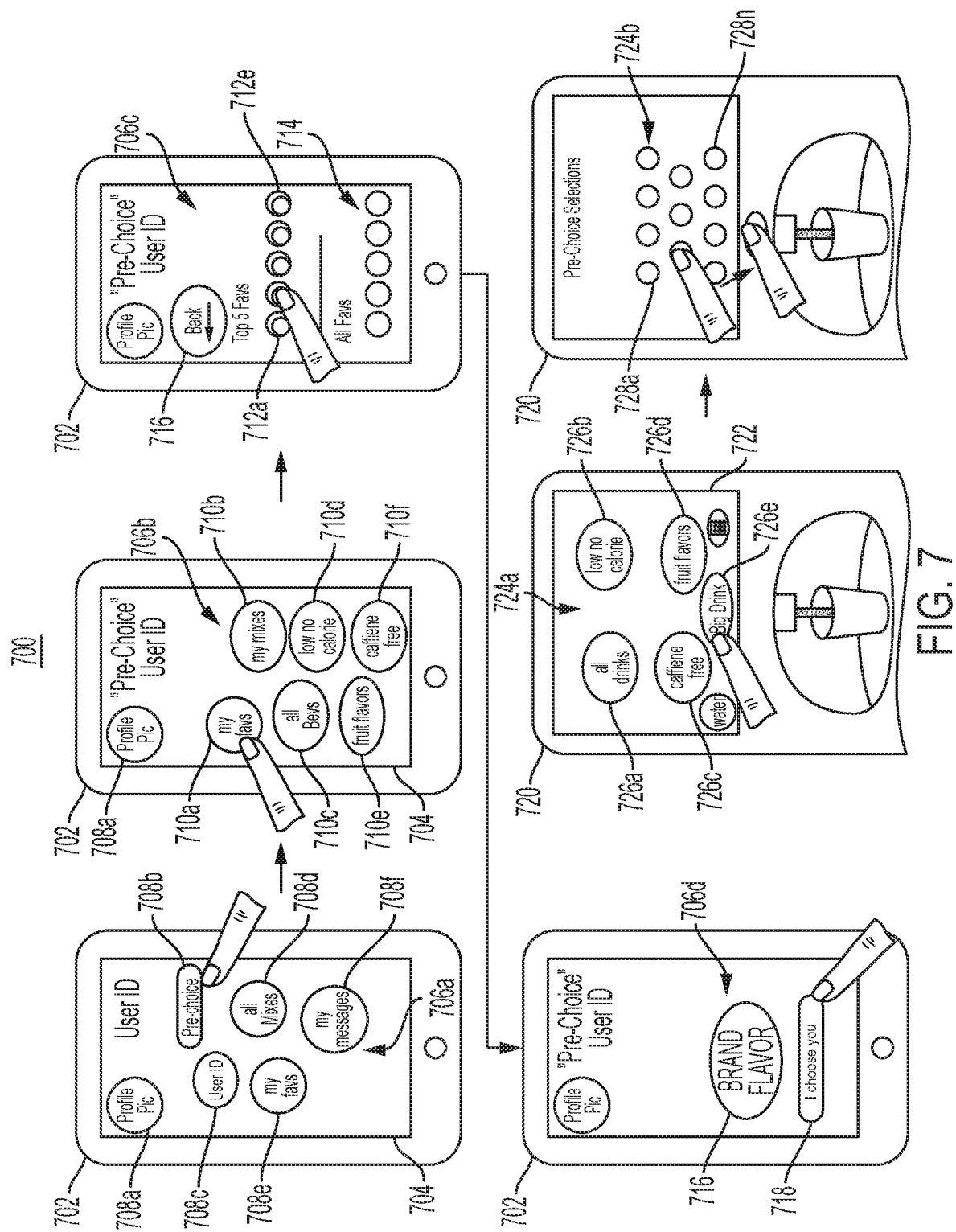
FIG. 7 is a sequence of illustrations of an electronic device with an electronic display on which a user interfaces to select beverages to be dispensed by a beverage dispenser.

With regard to FIG. 7, a sequence of illustrations 700 of an electronic device 702 with an electronic display 704 on which user interfaces 706a-706f (collectively 706) are shown. The user interfaces 706 are shown to be an illustrative set of user interfaces through which a user may view and/or select various profile information. On user interface 706a, the user may select or view a profile picture and user ID 708a, pre-choices or orders via soft-button 708b, "user ID" via soft-button 708c, "all mixes" via soft-button 708d, "my fays" (i.e., "my favorites") via soft-button 708e, "my messages" via soft-button 708e, and/or other selectable options. It should be understood that the soft-buttons are illustrative and that different and/or alternative soft-buttons may be provided to the user on any of the user interfaces 706.

In response to the user selecting the "pre-choices" soft-button 708b, user interface 706b may be shown to include a "my favorites" soft-button 710a, "my previous" soft-button 710b, "all beverages" soft-button 710c, "lo/no cal" soft-button 710d, "fruit flavors" soft-button 710e, and "caffeine free" soft-button 710f. In response to the user selecting the "my flavors" soft-button 710a, user interface 706c may enable the user to select up to five flavors using the user's top five flavors via soft-buttons 712a-712e (collectively 712) or from among all flavors 714. That is, the user may create a beverage including up to five of the selected flavors. It should be understood that an alternative number of flavors may be selected by a user, and that different users may select different numbers of flavors. After selection of up to five flavors, the user may select a "back" soft-button 716 to return back to user interface 706b. After the user has finished making his or her selection of a beverage including a brand with one or more flavors, user interface 706d may be displayed with the selected brand/flavor 716. If acceptable, the user may select an "I choose you" soft-button 718 to cause the selected brand/flavor 716 to be communicated to a beverage dispenser 720.

The beverage dispenser 720 may include an electronic display 722 on which a user interface 724 may be displayed. The user interface 724a may include a number of different selection soft-buttons 726a-726e (collectively 726) for enabling the user to control operation of the dispenser 720. The selection soft-buttons 726 may include an "all drinks" soft-button 726a, low/no cal" soft-button 726b, "caffeine free" soft-button 726c, "fruit flavors" soft-button 726d, and "pre-choice" soft-button 726e. In the event that the user selected a pre-choice via the user interfaces 706 and communicated the pre-choice from the mobile device 702 to the dispenser 720, the "pre-choice" soft-button 726e may cause user interface 724b to be displayed with "pre-choice" soft-buttons 728a-728n (collectively 728) that reflect pre-choices sent to the dispenser by one or more users.

In an embodiment, rather than sending the pre-choice 716 by itself, the user profile picture and user ID 708a may be communicated along with the pre-choice 716 so that the profile picture and user ID 708a may be displayed along with the pre-choice 716, thereby enabling the user to remember his or her choice (to avoid taking another user's pre-choice—especially beneficial if the pre-choices are removed after pouring) and to enable a store operator to more easily identify a user who ordered the pre-choice if the beverage dispenser 720 is positioned behind a counter. In an embodiment, all of the pre-choice selections may be listed or some of the pre-choice selections may be listed depending on the time-of-receipt of the pre-selections. In an embodiment, the pre-choices may be associated with an order time and the orders may be listed in a queuing order. The pre-choices may remain on the dispenser for a certain period of time, such as 30 or 60 minutes, and be removed thereafter, so that the user may re-access his or her pre-choice for refills during a meal without having to re-send. Such a decay time is helpful in the event that the user's pre-choice is a mix of multiple brands/flavors that could be time consuming for the user to re-create (if not saved).

Figure 8:
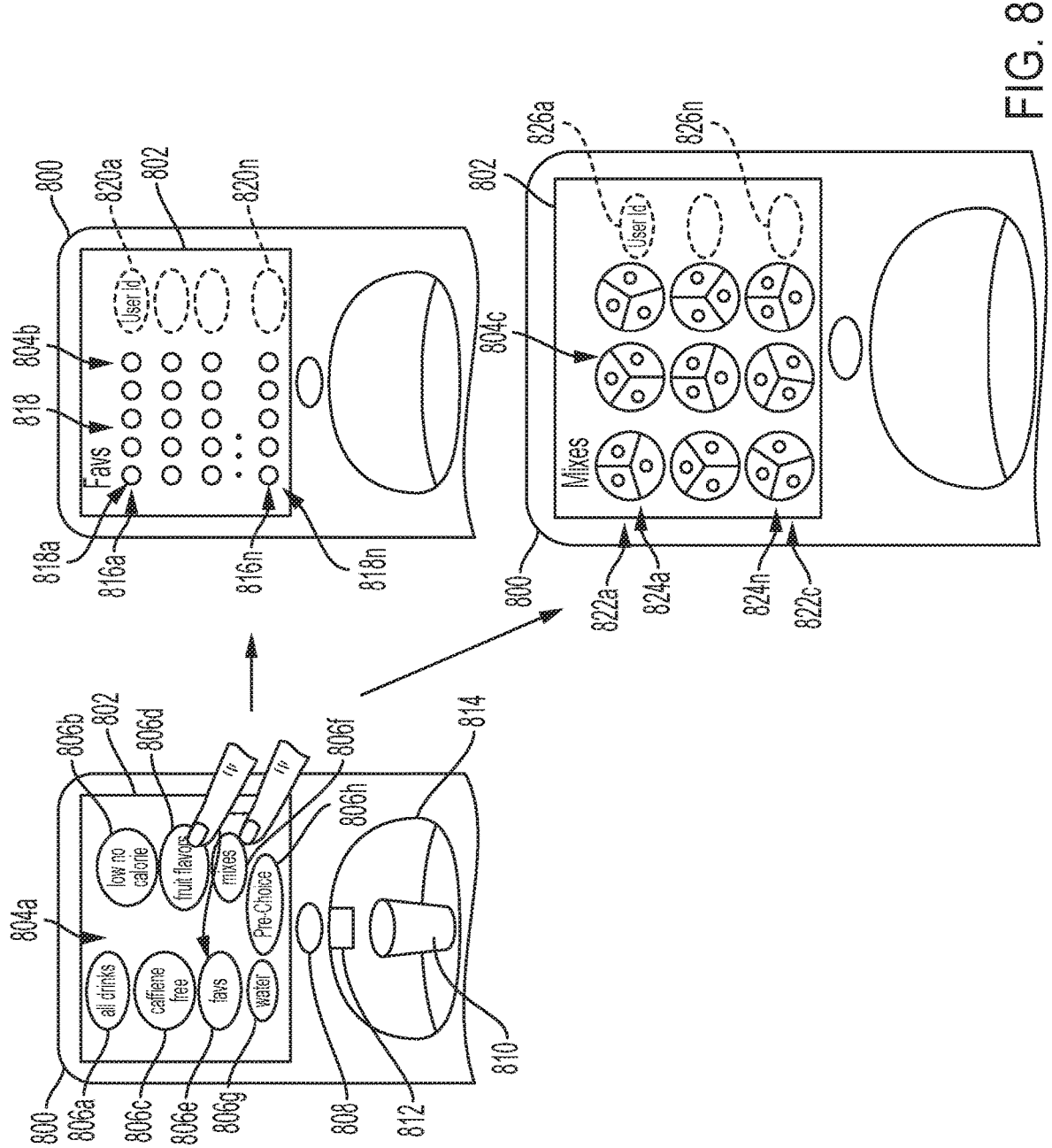
FIG. 8 is an illustration of an illustrative beverage dispenser that enables queuing of beverages to be dispensed by the beverage dispenser.

With regard to FIG. 8, an illustration of an illustrative beverage dispenser 800 that enables queuing is shown. The dispenser includes an electronic display 802a configured to display a user interface 804. The user interface 802 may include a number of user interface elements 806a-806n (collectively 806). The user interface elements 806 may include an "all drinks" element 806a, "low no cal" element 806b, "caffeine free" element 806c, "fruit flavors" element 806d, "fays" (favorites) element 806e, "mixes" element 806f, "water" element 806g, and "pre-choice" element 806h. It should be understood that additional and/or alternative elements may be provided for users to select to enable a user to select a beverage or otherwise control the dispenser in selecting and/or dispensing a beverage. The dispenser 800 may further include a "pour" hard-button 808 that, in response to a user pressing, causes a selected beverage to be dispensed into a cup 810 beneath a nozzle 812 located in a dispensing region 814.

In an embodiment, in response to a user selecting the "fays" element 806e, the electronic display 802 may display user interface 804b. The user interface 804b may display a list of favorite beverage listings 816a-816n (collectively 816) of local users (e.g., closest three or five users) or of users who have recently (e.g., within the past 30 minutes) accessed the dispenser 800. The list 816 may include sets of beverages 818a-818n (collectively 818) associated with respective user IDs 820a-820n (collectively 820). That is, each of the sets of beverages 818 associated with each of the user IDs 820 is favorite of the respective user, thereby allowing each user to select a favorite beverage from amongst his or her own favorites along with optionally selecting a favorite beverage from other users. In an embodiment, rather than showing a user ID, an image of a user (e.g., photo, avatar, emoji, etc.) may be displayed on the user interface 804b.

Although five favorite beverages are shown to be displayed, more or fewer favorite beverages may be displayed. If, for example, the user has only used the dispenser one time, then it may be possible that the user only has a single favorite beverage. After using the dispenser five or more times and dispensing five or more different beverages, those beverages may be determined to be the user's five favorite beverages. Alternatively, the user may use his or her mobile device to pre-set favorite beverages without first interacting with the dispenser, thereby allowing for the pre-set favorite beverages to be displayed without having to first access the dispenser 800 via his or her mobile phone (or even directly). In an embodiment, the dispenser 800 may communicate or otherwise synchronize with a mobile device of the user after the user interacts with the dispenser (and indicates who the user is) to update the mobile device for future use. In an alternative embodiment, the dispenser 800 may communicate usage information to an online server that may manage usage and other user-specific data (e.g., favorites, pre-choices, mixes, etc.), which the user may thereafter have access via the mobile device or dispenser 800.

In an embodiment, in response to a user selecting the "mixes" element 806f, the electronic display 802 may display user interface 804c. The user interface 804c may display a list of mixes 822a-822n (collectively 822) of local users (e.g., closest three or five users) or of users who have recently (e.g., within the past 30 minutes) accessed the dispenser 800. The list 822 may include sets of mixes 824a-824n (collectively 824) associated with respective user IDs 826a-826n (collectively 826). That is, each set of mixes 818 associated with each of the user IDs 820 is favorite of the respective user, thereby allowing each user to select a mix from amongst his or her own mixes along with optionally selecting a mix from other users. In an embodiment, rather than showing user IDs 826, an image of a user (e.g., photo, avatar, emoji, etc.) may be displayed on the user interface 804c. The number of mixes for each user is shown to include three. However, more or fewer mixes may be displayed in association with each of the user IDs 826. In an embodiment, the number of ingredients (e.g., beverage brands) and/or flavors for each mix may be up to three. However, more or fewer ingredients and/or flavors may be possible, as well. The mixes may be created on the dispenser 800 or on an electronic display, such as a user's mobile smartphone and communicated to the dispenser 800 for selection, thereby causing the dispenser to generate a mix that includes the ingredients and/or flavors in the percentages selected by the user.

Figure 9:
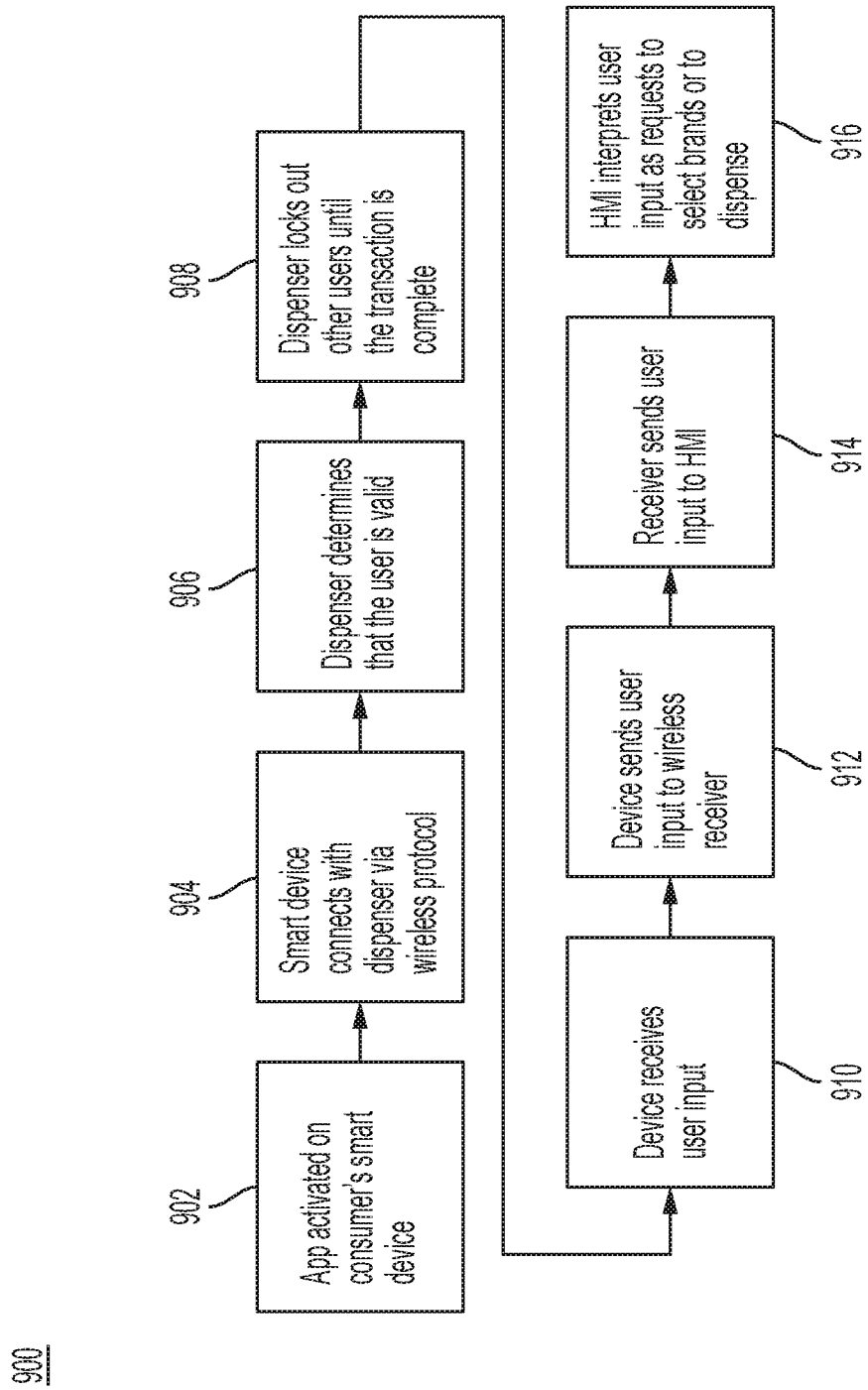
FIG. 9 is a flow diagram of an illustrative process for a user to select and communicate beverage selections from a mobile electronic device or smart device to a beverage dispenser.

With regard to FIG. 9, a flow diagram of an illustrative process 900 for a user to select and communicate beverage selections from a mobile electronic device or smart device to a beverage dispenser is shown. The process 900 may start at step 902, where an app may be activated on a consumer's smart device. In activating the app, the consumer may download the app from an app store, as understood in the art. In addition, the consumer may enter his or her information, including a user ID, image, demographic information, biographical information, and/or other information so that the app may be capable of communicating information to a dispenser for identification purposes along with a beverage selection. At step 904, the smart device may connect with a beverage dispenser via and local wireless protocol, as previously described. At step 906, the dispenser may determine that the user is valid. In determining that the user is valid, the dispenser may communicate with a network server with which the user previously registered using the mobile app during or after the app activation process of step 902. After determining that the user is valid at step 906, the process 900 may continue at step 908, where the dispenser may lock out other users until the transaction with the user is complete. In an alternative embodiment, the dispenser may be configured to enable multiple users to simultaneously perform a transaction, but load other beverage selections into a queue or random selectable list for later selection for dispensing by the other user or consumer to dispense his or her selected beverage.

At step 910, the smart device may receive a user input that include selection of a beverage. The selection of the beverage may include one more beverage brands, flavors, or otherwise. At step 912, the smart device may send the user input to a wireless receiver of the dispenser, which, in turn, may send the user input to a human-machine interface (HMI) step 914. At step 916, the human-machine interface may interpret the user input as requests to select and/or to dispense the selected beverage from the dispenser into a vessel, such as a cup, placed beneath a nozzle of the dispenser, as previously described.

Figure 10:
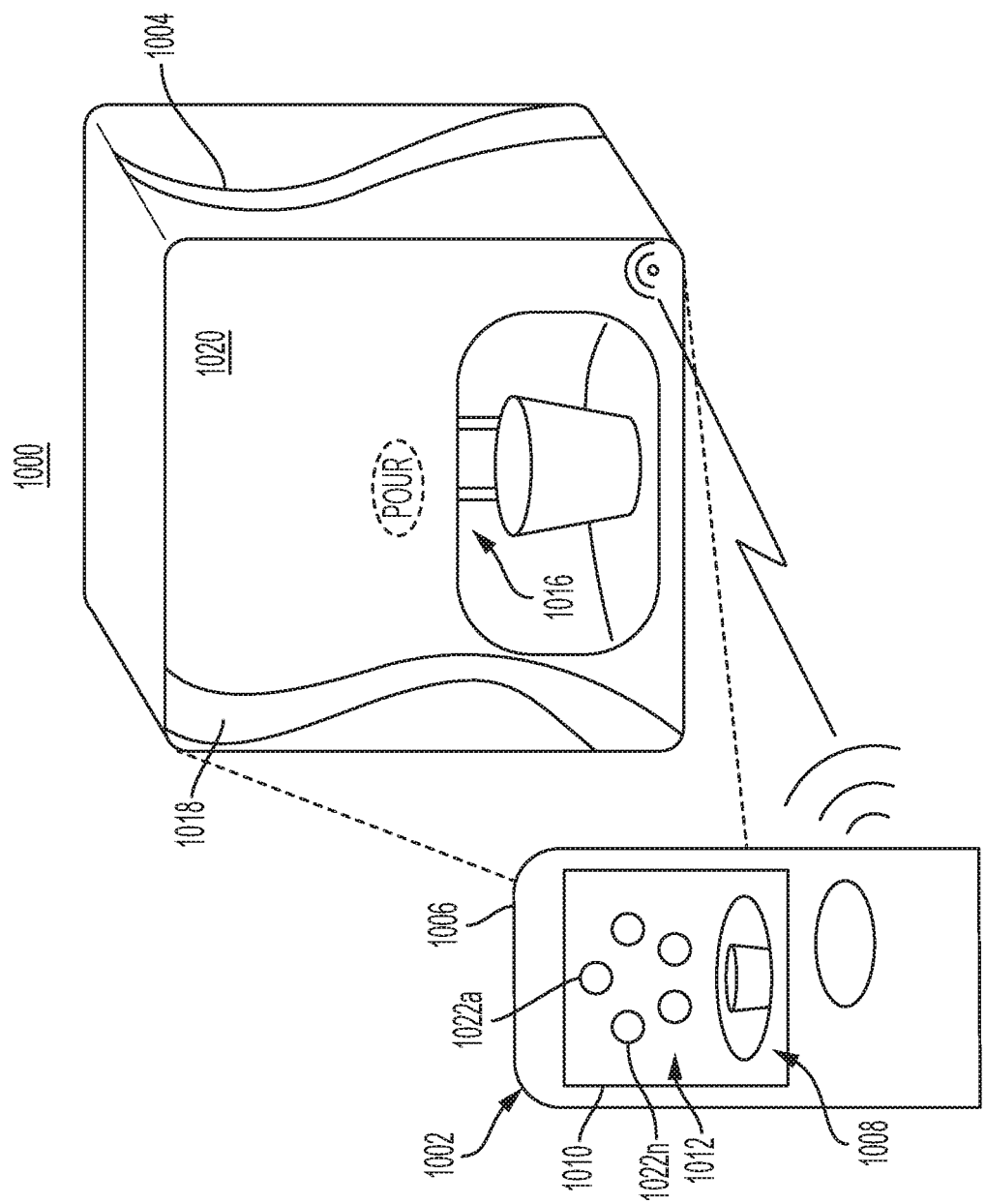
FIG. 10 is an illustration of an illustrative scene in which an electronic device executing an app capable of performing virtual reality for controlling and/or communicating with a beverage dispenser.

With regard to FIG. 10, an illustration of an illustrative scene 1000 in which an electronic device 1002 executing an app capable of performing virtual reality for controlling and/or communicating with a beverage dispenser 1004 is shown. The electronic device 1002 includes a built-in camera 1006, as understood in the art, that enables the app being executed by the electronic device 1002 to image the dispenser 1004. In imaging the dispenser 1004, the app may display an image 1008 of the dispenser 1004 on an electronic display 1010 of the electronic device 1002. As shown, the dispenser 1004 may be configured without an electronic display positioned thereon for selection of a beverage, but the app may display a virtual reality (VR) user interface 1012 on the image 1008 of the dispenser 1004. In an embodiment, the app may use image processing to identify one or more features of the beverage dispenser 1004, and virtually place the VR user interface 1012 on a front surface of the image 1008 of the dispenser 1004. The features of the beverage dispenser 1004 may include a dispenser area 1014, an ice dispense mechanism 1016, a print 1018 (e.g., logo or other graphical image) on a front surface 1020 of the dispenser 1004, and so on.

In an embodiment, the VR user interface 1012 may include multiple beverage selection elements 1022a-1022n

(collectively 1022) for the user to select for beverage selection. The VR user interface 1012 may be configured to perform the same or similar functionality for selecting beverage brands and/or flavors, as previously described. By not including an electronic display on the dispenser 1004, the cost of the dispenser 1004 may be lower than one with an electronic display. In an alternative embodiment, the dispenser 1004 may include an electronic display that may be used for selecting beverages and dispensing the beverages by the dispenser 1004, as previously described. The electronic device 1002 may either be a customer-owned electronic device that downloaded the app or a special purpose electronic device 1002 that is limited to operate with the dispenser by executing only the (or a limited set of apps associated with dispensed beverages) app that performs the VR user interface 1012.

As with virtual reality systems, the VR user interface 1012 may be capable of enabling the user to "flick" or otherwise virtually pass a beverage selection or order from the electronic device 1002 to the dispenser 1004. In response to the user performing a "flick" gesture, beverage order data, which may include beverage selection data (e.g., beverage brand(s) and beverage flavor(s), user ID, user image, or any other information that may be displayed on the dispenser 1004) may be communicated to the dispenser 1004. In performing the virtual "pass," any number of dynamic graphical images, such as tossing a can of the beverage, floating a bubble from the electronic device 1002 to the dispenser 1004, may be displayed on the VR user interface 1012 and/or a user interface on a dispenser (see, for example, FIG. 6A). If the dispenser 1004 included an electronic display, such as shown in FIG. 3A, some or all of the beverage order data may be displayed on the electronic display. In response to the selected beverage data being received by the dispenser 1004, the dispenser 1004 may enable the user (or other operator) to dispense the selected beverage by the dispenser 1004. In an embodiment, the dispenser 1004 may enable the user to change or adjust the selected beverage. Alternatively, the user may change or cancel the selected beverage via the dispenser 1004 or electronic device 1002. If the user is performing a VR order via the electronic device 1002, the dispenser 1004 may prevent other electronic devices from communicating with the dispenser 1004 or may enable other electronic devices to communicate with the dispenser 1004, but may create a queue based on received orders from the electronic devices.

In an embodiment, to add excitement, fun, or game theory to the app, the VR app may provide for a user to "flick" the drink order into a virtual cup. There may be multiple virtual cups of different sizes, small on the left, medium in the middle, and large on the right when the electronic device 1002 is facing and displaying the dispenser 1004. Depending on which cup the user flicks the drink order into, the selected size (i.e., small, medium, or large) may be communicated to the dispenser. If the drink size is sent to the dispenser 1004, rather than the user having to hold a button for dispensing a select amount of the selected beverage, the dispenser 1004 may dispense whatever number of ounces are associated with the selected size. In another embodiment, an award may be given to a user who makes a virtual basket into a virtual cup in a single shot. The award may be a free refill for a certain number of hours, a discount on a next purchase, or otherwise.

Figure 11:
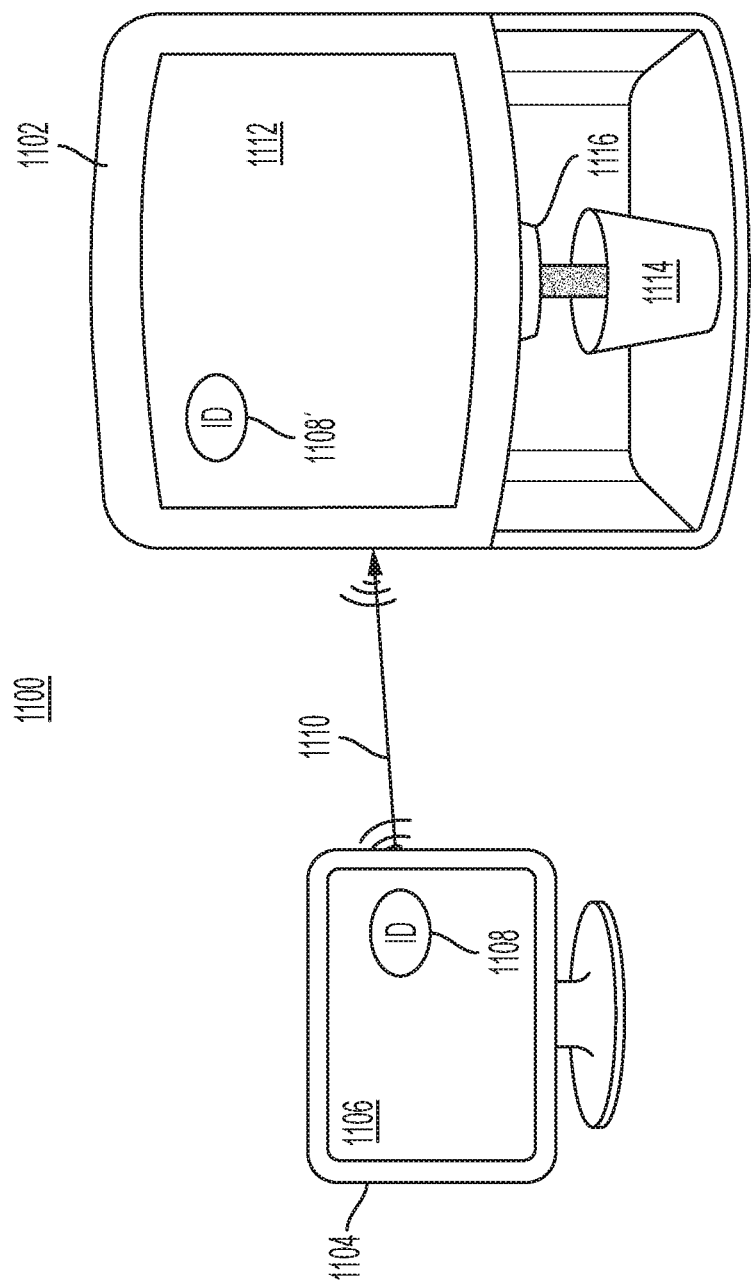
FIG. 11 is an illustration of an illustrative environment in which a crew-serve dispenser may be controlled by a remote point-of-sale (POS)

With regard to FIG. 11, an illustration of an illustrative environment 1100 in which a crew-serve dispenser 1102 may be controlled by a remote point-of-sale (POS) 1104 is shown. The POS 1104 may include a touch/gesture sensitive electronic display 1106 that enables an operator to touch and select beverage brands and flavors in association with an order identifier 1108, such as a number, name, image, or other indicator associated with an order of a customer, displayed on the electronic display 1106. The POS 1104 may also include a communications channel 1110 with the dispenser 1102 for communicating beverage orders thereto. In an embodiment, the communications channel 1110 may be a wireless communications channel. The wireless communications channel may utilize a local wireless communications protocol, such as Bluetooth, WiFi, or any other local wireless communications protocol, as understood in the art. Alternatively, the communications channel 1110 may be a wired communications channel that uses any network communications protocol, as understood in the art. In operation, the crew server dispenser 1102 is manually controlled by a crew member such that the crew member is able to touch an order ID 1108' displayed on a touch-sensitive display 1112 to cause the dispenser 1102 to select and/or pour a selected beverage at the POS 1104 into a cup 1114 beneath a nozzle 1116.

With regard to FIG. 12A, a flow diagram of an illustrative process 1200a for an electronic device and a beverage dispenser to collect and dispense a drink order is shown. The electronic device may be a smartphone of a customer, and the beverage dispenser may be a dispenser that is positioned for access by the customer or for an operator at a venue, such as a restaurant. The electronic device may alternatively be positioned on a wall or other location that is local to the dispenser. The process 1200 may start at step 1202, where inputs on the electronic device may be received via a user interface, as previously described. The inputs may be selection of a beverage brand, selection of a flavor of the beverage brand, selection of multiple beverage brands that are to be combined into a single beverage mix, multiple flavors that are to be combined into the beverage mix, and so on. In an embodiment, the user interface may include previously selected beverages, favorites, favorites of friends, favorites of others within the restaurant, and so on.

At step 1204, a beverage order may be created by the electronic device. In an embodiment, the beverage order may include codes or a series of codes associated with beverage brand(s) selected, flavor(s) selected, size of beverage selected, user identifier, user icon/image, timestamp, and/or other information of which may be used by the dispenser for preparing and dispensing a beverage either manually or automatically. For example, the beverage order may use a particular format, such as initials for each brand and/or flavor (e.g., "CCO" for Coca-Cola Original, "CCC" for Cherry Coca-Cola, "SPD" for Sprite Diet, and so on). If a mixed beverage order including multiple beverage brands is selected, then the initials may be concatenated, such as "CCOSPD." If a mix is selected, then percentages of the different beverage brands may also be included, such as "CCO60SPD40" for Coca-Cola Original 60% Sprite Diet 40%. Other combinations or coding techniques may be utilized, and may further include flavors, such as cherry and other flavors. Alternatively, the full names of the beverage brands and flavors may be included in the beverage order. The beverage order may be communicated from the electronic device to the dispenser via a communications channel, as previously described, where the beverage order may also include size of the beverage, such as "S" for small, "M" for medium, "L" for large or specific amount of volume of the beverage, such as "8 oz," "20 ml," or otherwise that may be part of the beverage order.

At step 1206, the beverage dispenser may receive the beverage order from the electronic device, and, in an embodiment, display the beverage order on an electronic display of the dispenser. In displaying the beverage order, a decoder software module may be configured to decode the beverage order, such as determining actual names of the beverage(s) and/or ingredients and percentages thereof for display in a more human-readable friendly format. The dispenser may convert the beverage order from the codes to the names of the beverage(s) and display the name(s) of the beverage(s) on the electronic display. Optionally, size of the ordered beverage may be displayed. On the display, a user name of the consumer, order number, image of the consumer, and/or identifier associated with the user may be displayed. Depending on the configuration of the dispenser, the beverage order may be displayed in a queue on the electronic display of the dispenser. In an embodiment, the dispenser may automatically be configured to dispense the received beverage order and in the percentages as selected if a beverage mix were selected.

At step 1208, a pour command may be received by the dispenser, and the dispenser may pour the selected beverage. In an embodiment, the dispenser may receive a manual pour command from a user who presses a hard-button or soft-button on the dispenser. In one embodiment, if the size of the beverage is provided to the dispenser, then the user may press and release the hard-button to dispense the selected beverage in the size requested. In an embodiment, the dispenser may be configured to detect a size of a cup prior to dispensing the beverage, thereby preventing the dispenser from overflowing the cup. If the size of the beverage is not provided to the dispenser, then the user may press the pour button to manually fill the cup. In an embodiment, if an app being executed by the electronic device and the dispenser is configured to receive a pour command from the electronic device, then in response to the user pressing a "pour" soft-button on the electronic display, the dispenser may pour the beverage from the remote control being received. The remote control configuration is to operate in substantial real-time to avoid too much latency for a user to adequately control the dispenser in pouring the beverage. The remote control functionality may allow for control of a cursor or cause a user interface on the dispenser to display the same or similar operations being displayed and dynamically changed on the mobile device. Still yet, the dispenser may perform electromechanical functions in response to receiving a command, such as a mix beverage command, from an electronic device and alter position or state (e.g., closed to open) of one or more valves to create the mixed beverage while dispensing the mixed beverage.

At step 1210, prior to or in response to receiving the pour command, a recipe may be "mixed" by the dispenser to form the selected beverage, and the beverage may be poured. In mixing the selected beverage, one or more valves, pumps, or other fluid control mechanism may be engaged to output ingredients of the selected beverage brands and/or flavors. The ingredients may be macro or micro ingredients depending on the type of beverage and configuration of the dispenser.

After the beverage is poured, the process may exit at step 1212. In an embodiment, the dispenser may store the beverage information for a predetermined amount of time, such as one-hour, for the customer to refill his or her beverage. The dispenser may be set to limit the amount of refills in terms of number of refills, number of fluid ounces, or otherwise. The dispenser may further communicate a receipt or acknowledgement back to the electronic device that the beverage was poured for storage thereat. The app may store the information along with a timestamp, geographic location (e.g., restaurant name, restaurant location, geopolitical location, etc.), user name or ID, and/or otherwise.

With regard to FIG. 12B, a flow diagram 1200b of an illustrative process for receiving and dispensing an order is shown. The process 1200b may start at steps 1214 and 1216, which may be the same or similar as steps 1202 and 1204 of FIG. 12A, where a user using a first electronic device may enter or select a beverage order, and the first electronic device may create the beverage order. At step 1218, a connection may be established with a second device, which may be a dispenser or an electronic device that may work in conjunction with the dispenser. The connection may utilize any communications protocol, as understood in the art. For example, the connection may be a local wireless connection, such as a Bluetooth, WiFi, or otherwise. In an embodiment, at step 1220, the second device may retrieve the beverage order from the first electronic device by polling or otherwise requesting the beverage order (e.g., code representative of a selected beverage, user identifier, user image, etc.). Alternatively, the beverage order may be communicated from the first electronic device to the second electronic device, where the beverage order may include specific ingredient(s) and percentages and/or amounts of the ingredient(s) to be dispensed.

At step 1222, a determination may be made as to whether the user modified the order at the second electronic device. In an embodiment, the decision to modify the order may be made based on a decision to change the beverage that the user desires or in the event that the dispenser is unable to fulfill the exact order due to not having an ingredient at the dispenser or not having sufficient amount of the ingredient at that time. If so, then the process may continue to step 1224, where a new recipe may be created. The process 1200b may continue at step at step 1226 to receive a pour command from the first or second device, and at step 1228 to execute a recipe (i.e., create a formulation with one or more ingredients and/or flavors) prior to or while pouring the selected beverage to fulfill the beverage order. The process may exit at step 1230.

Figure 13A:
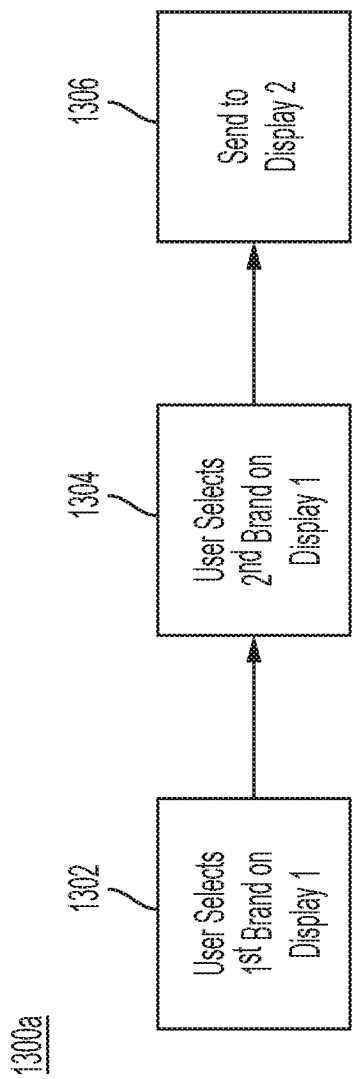
FIG. 13A is an illustration of an illustrative process for enabling a user to perform a beverage order using an electronic device, such as a mobile device, that shares video memory with a beverage dispenser.

With regard to FIG. 13A, an illustration of an illustrative process 1300a for enabling a user to perform a beverage order using an electronic device, such as a mobile device, that shares video memory with a beverage dispenser is shown. Such a shared memory configuration may provide efficiency and reduce cost of the beverage dispenser. The process 1300a starts at step 1302, where a user selects a first brand on a first display. In the event that the user desires to create a mixed beverage with multiple ingredients, at step 1304, the user may optionally select a second beverage brand on the first display. The locations of the selections and actions displayed on the first display may be communicated to a second electronic display at step 1306, such as an electronic display configured on the beverage dispenser. In selecting the selected beverage information, the user interface operating on the electronic device may provide for (i) single touch, (ii) touch and hold, and/or (iii) touch, hold, and layoff. Other selection techniques may be provided for, as well. To send the beverage order to the second electronic display on the beverage dispenser or otherwise, a swipe, flick, drag and drop, "bump," near-field communications (NFC), local wireless communications, display/scan machine readable code (e.g., barcode, quick reference (QR) code), or any other technique to communicate the beverage selection to the dispenser may be utilized, such as the use of a shared memory as provided in FIG. 13B.

Figure 13B:
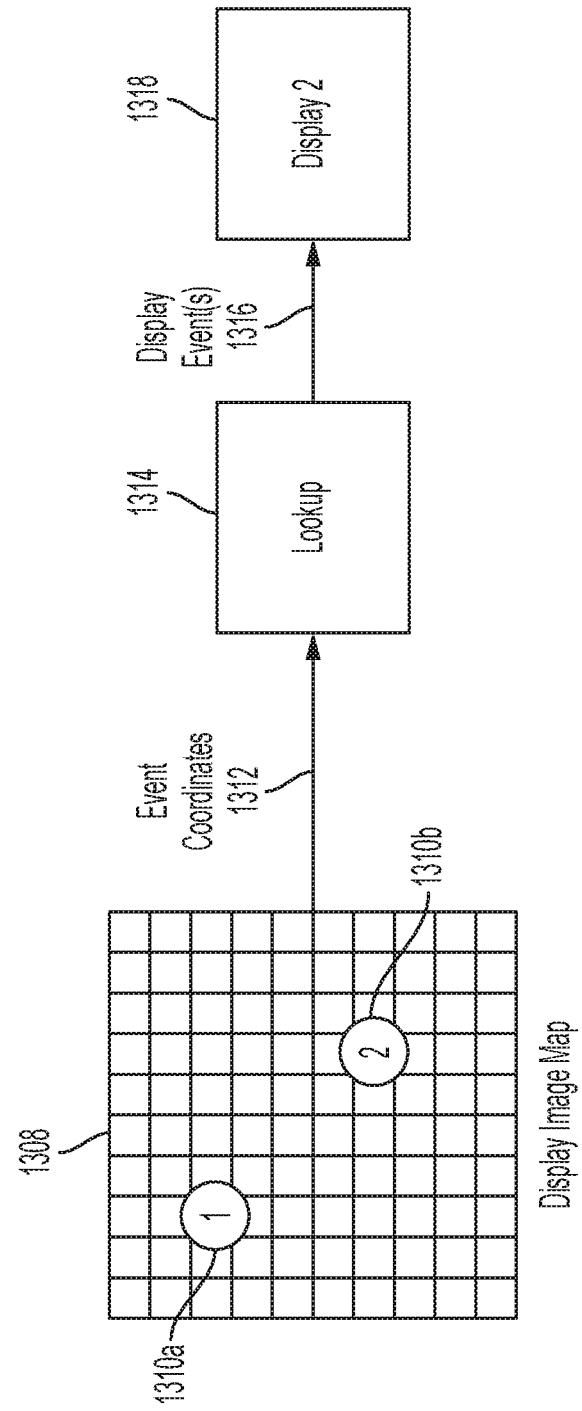
FIG. 13B is an illustrative process that includes a display image map that may be an electronic memory on the electronic device of the user.

As shown in FIG. 13B, an illustrative process 1300b is shown to include a display image map 1308 that may be an electronic memory on the electronic device of the user. Alternatively, the display image map 1308 may be an electronic memory operating on the beverage dispenser, as described with regard to FIG. 13A. The display image map 1308 shows two temporally distinct finger "touches" 1310a and 1310b that were made by a user on a touch screen of the electronic device being used by the user for selecting beverage ingredients in steps 1302 and 1304, respectively. The first touch 1302, which is representative of a location at which the user's finger touched the electronic display, may define event coordinates 1312 that may use a Cartesian coordinate system (i.e., X,Y locations) that are looked up at step 1314. The lookup step 1314 may be performed by software that is executed by a computing device (e.g., computer processor) either on the electronic device or on the dispenser, and maps the touches onto coordinates of graphical features (e.g., icons) of a user interface to determine which, if any, graphical features the user touched with each of the finger "touches" 1310a and 1310b. From the lookup, display event(s) 1316, which may include a beverage brand, flavor, or other selection, may be output to the second electronic display 1318 for display therein. In this embodiment, if the display image map 1308 is shared video space on the electronic device of the user, then the amount of memory and complexity of the dispenser may be reduced. In such an embodiment, the software on the dispenser may either receive the finger "touches" information as the event coordinates 1316 or the software may access the display image map 1308 during a session that the electronic device and dispenser are in active communication such that the software actively retrieves the finger "touches" coordinates. If the lookup is performed by the electronic device, then the display event(s) 1316 may include a variety of information, such as coordinates of the touches, selected brand(s), and so on, for display on the second display of the dispenser. The use of shared memory enable operation of a single electronic display that appears as two electronic displays.

With regard to FIG. 14, an illustration of an illustrative beverage dispenser arrangement 1400 including a beverage dispenser 1402 configured to dispense beverages is shown. The beverage dispenser 1402 may include an electronic display 1404 on which a user interface 1406 is displayed. The user interface 1406 may include a number of icons 1408 representative of beverage brands and/or flavors, as previously described. In an embodiment, a "pour" hard-button 1410 is included for a user to press to dispense a selected beverage. In an embodiment, the dispenser 1402 may be in electronic communication with a user interface or machine human interface (HMI) 1412. The user interface 1412 may be any electronic display that is hardwire or wirelessly connected or connectable to the beverage dispenser 1402. In an embodiment the user interface 1412 may be provided by the maker of the beverage dispenser 1402, and include one or more wired or wireless communications channels. For example, a high-definition multimedia interface (HDMI) communications channel is provided to allow for high-speed bandwidth, thereby enabling interesting graphics and/or video to be communicated between the user interface 1412 and beverage dispenser 1402. In an embodiment, a low-voltage differential signaling adapter 1416 communications channel may be utilized to enable communications between the user interface 1412 and beverage dispenser 1402 to allow for low-bandwidth communications, such as beverage orders, to be performed. It should be understood that a wide variety of different communications protocols may be utilized that enable high and low bandwidth communications between the user interface 1412 and beverage dispenser 1402.

Figure 15:
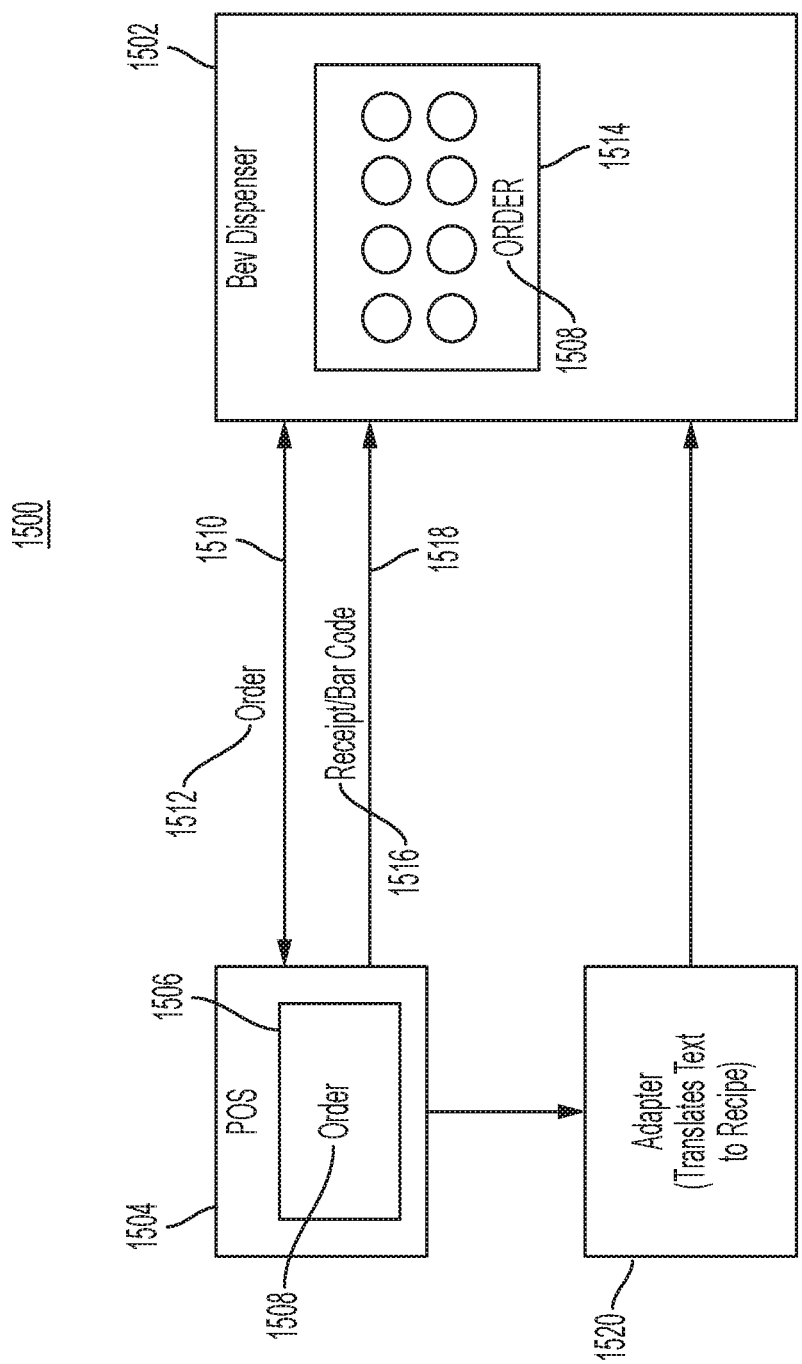
FIG. 15 is an illustration of an illustrative environment in which a beverage dispenser is in communication with a point-of-sale (POS)

With regard to FIG. 15, an illustration of an illustrative environment 1500 in which a beverage dispenser 1502 is in communication with a point-of-sale (POS) 1504 is shown. The POS 1504 may include a user interface 1506 via which an order 1508 may be placed. The beverage dispenser 1502 may be in communication with the POS 1504 via a communications channel 1510. The order 1508 may be communicated as an order signal 1512, which may be a digital representation of the order 1508. For example, the order 1508 may be for a particular beverage brand with a particular flavor and for a particular size and be associated with an order number and/or customer, and the order signal 1512 may be a coded signal that represents the beverage order 1508. The beverage dispenser 1502, which includes a processor, may receive the order signal 1512 and convert the order signal 1502 to display the order 1508 on an electronic display 1514 for a customer or employee to select for pouring the selected beverage, where processor may parse the order signal 1512 and automatically configure the dispenser 1502 to pour the selected beverage, as previously described. In an embodiment, the POS 1504 may communicate a receipt and/or barcode 1516 via a communications channel 1518 to the beverage dispenser for display on the electronic device 1514. In an embodiment, the communications channels 1510 and 1518 may be the same, and may be wired or wireless. An adapter 1520 may be configured to translate text to a receipt for communication to the beverage dispenser 1502 for display on the electronic display 1514 or processing by dispenser 1502 to enable the dispenser to automatically configure itself to dispense an order and/or enable a user to enter an order number for dispensing the ordered beverage. The adapter 1520 may be configured to convert text, such as the order signal 1512, to produce a receipt that is configured or compatible for the beverage dispenser 1502. It should be understood that the user may select a different beverage than ordered that complies with the selected beverage (e.g., same size to type of beverage).

Figure 16:
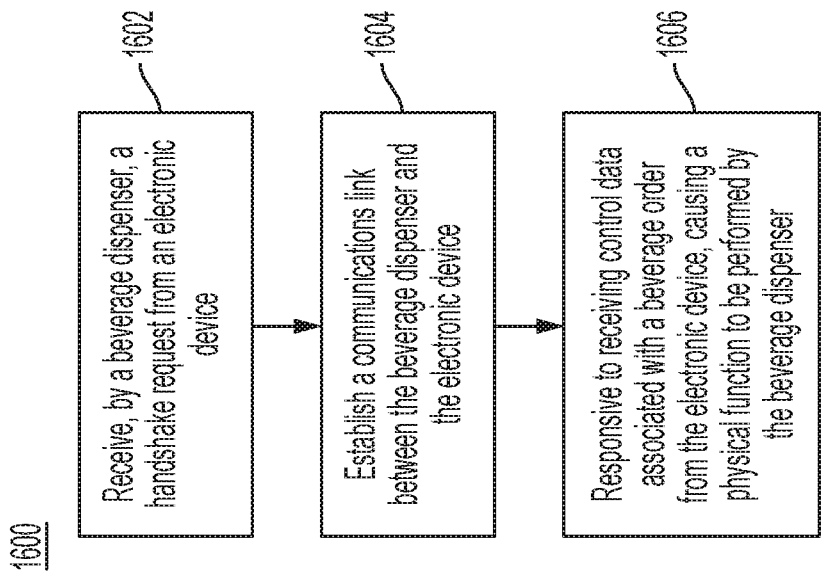
FIG. 16 is a flow diagram of an illustrative process for operating a beverage dispenser.

With regard to FIG. 16, a flow diagram of an illustrative process 1600 for operating a beverage dispenser is shown. The process 1600 may start at step 1602, where an electronic handshake request may be received by a beverage dispenser from an electronic device, such as a mobile device (e.g., smartphone of a user). The electronic handshake may be performed using any communications protocol for initiating an electronic communication between two electronic devices, including local and long distance wireless and wireline communications protocols. At step 1604, a communications link may be established between the electronic device and beverage dispenser. Responsive to receiving control data associated with a beverage order from the electronic device, a physical function may be caused to be performed by the beverage dispenser at step 1606. The physical function may range from causing the electronic display to dynamically change in a real-time manner to altering states of electromechanical devices to enable specific ingredients to be dispensed when dispensing an ordered beverage. In an embodiment, a decoder software module may be utilized to decode a coded (e.g., abbreviated beverage ingredients) along with percentages, order ID, and other information for use in preparing or serving the ordered beverage.

In an embodiment, causing a physical function to be performed by the dispenser includes dispensing an ingredient into a vessel of the user. The physical function may include moving a cursor on an electronic display of the beverage dispenser to enable selection of a selection element being displayed on the electronic display. The physical function may be displaying an image, such as a photograph or avatar, associated with the user. In an embodiment, a user interface being displayed on an electronic device of the beverage dispenser may be altered.

The process may further include executing an augmented reality process that, in response to receiving control data, is configured to display an augmented reality display on the mobile device. In response to receiving control data from the mobile device, the process may further include displaying ingredients selected by the user as communicated with the control data on an electronic display of the beverage dispenser, and further cause the ingredients to be dispensed by the beverage dispenser. The physical function may further include synchronizing a user interface on the beverage dispenser with a user interface being displayed on the mobile device. The process may further include preventing communication with other mobile devices after the handshake and prior to completion of a transaction with the mobile device. In an embodiment, the electronic device is a smartphone. Receiving control data may include receiving control data from a biometric tracking device responsive to a biometric action performed by a user.

In one embodiment, second control data may be received from a second mobile device of a second user in conjunction with a second beverage order, the second control data may be stored in a memory unit, and data associated with the user of the second mobile device may be displayed. The data associated with the user of the second mobile device may be displayed in a queue of beverage orders. Information being displayed on each of the beverage dispenser and the mobile device may be synchronized. For example, if a user is engaging with the user interface on the mobile device, then the same or similar operations may be performed on the user interface on the beverage dispenser. If a virtual reality display is being operated on the mobile device, then a corresponding and/or interactive operation may be performed on the electronic display of the beverage dispenser. Alternatively, the virtual or augmented reality may be limited to the electronic display on the mobile device, and in response to a success or failure by the user playing on the mobile device, beverage order information may be communicated to the beverage dispenser. For example, if the user successfully completes a VR action, then the user may earn a larger beverage than the ordered beverage.

In response to receiving control data representative of a display graphic being shifted or moved from the mobile device, a command represented by the control data may be executed. For example, the dispenser may cause one or more electromechanical devices to change state when a beverage is dispensed. Receiving the control data may include receiving the control data that is representative of a motion gesture by the user. Receiving the control data may include receiving the control data that is representative of the user touching or moving a finger on a particular location on the dispenser. Receiving the control data may be representative of a particular location associated with a physical button on the beverage dispenser, and a physical function may be caused to be performed that corresponds to the physical function that would occur if the user were to press the physical button on the beverage dispenser. That is, the user touching the location of the physical feature may communicate coordinate data and/or function operation associated with the physical feature, which causes the beverage dispenser to perform that physical action. In operation, control data may be communicated by the mobile device (i.e., as instructed by an app operating on the mobile device) to the dispenser.

In an embodiment, a graphical representation of a beverage indicia may be moved from a first electronic display to a second display in response to receiving the control data. For example, if there are multiple electronic displays on the beverage dispenser, one for user interaction and another that shows the particular beverage (either a single or mix of ingredients) to be dispensed, then a graphical representation (e.g., icon) may be moved in an animated manner, for example, from the user interaction electronic display to the beverage-to-be-dispensed electronic display. A beverage associated with the beverage icon may be dispensed by the dispenser in response to a user interacting with (e.g., touching or pressing) the second display or hard-button associated therewith.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A beverage dispenser, comprising:
    a non-transitory memory configured to store user control data;
    an input/output (I/O) unit configured to communicate over a communications network with a mobile device;
    a processing unit in communication with said memory and I/O unit, and configured to:
        pour a selected beverage responsive to user selection of an activation element on the beverage dispenser;
        receive, via the communications network, a handshake request from the mobile device;
        establish a communications link with the mobile device; and
        responsive to receiving control data associated with user activation of a pour button corresponding with the activation element on a user interface of the mobile device, cause a physical function to be performed in a real-time manner by the dispenser to pour a beverage while the pour button is held.

2. The beverage dispenser according to claim 1, further comprising a dispenser mechanism configured to dispense an ingredient into a vessel of a user, and wherein said processing unit, in causing a physical function, includes causing the dispenser mechanism to dispense the ingredient into the vessel.

3. The beverage dispenser according to claim 1, wherein said processing unit is configured to move a cursor being displayed on an electronic display of the beverage dispenser responsive to user interaction with the user interface on the mobile device.

4. The beverage dispenser according to claim 1, wherein said processing unit is configured to display an image associated with the user responsive to the control data.

5. The beverage dispenser according to claim 1, wherein said processing unit is configured to alter a user interface being displayed on a display of the beverage dispenser responsive to user interaction with the user interface on the mobile device.

6. The beverage dispenser according to claim 1, wherein said processing unit is further configured to synchronize a user interface on an electronic display of the beverage dispenser with the user interface being displayed on the mobile device.

7. The beverage dispenser according to claim 1, wherein said processing unit is further configured to:
    receive second control data from a second mobile device of a second user in conjunction with a second beverage order;
    store the second control data in said memory unit; and
    display data associated with the user of the second mobile device.

8. The beverage dispenser according to claim 1, wherein the control data is representative of the user touching or moving a finger on a particular location on the dispenser.

9. The beverage dispenser according to claim 8, wherein the particular location includes a physical button of the dispenser, and wherein the processing unit is configured to cause the physical function that corresponds to a physical function that would occur if the user were to press the physical button.

10. The beverage dispenser according to claim 1, wherein said beverage dispenser is further configured with a first electronic display and a second electronic display, and wherein the processing unit is configured to move a graphical representation of a beverage indicia from the first display to said second display responsive to second control data associated with user activation of the user interface of the mobile device.

11. The beverage dispenser according to claim 10, wherein said second display or hard-button associated therewith is selectable by the user to cause a beverage associated with the beverage icon to be dispensed by the dispenser.

12. A method for operating a beverage dispenser, comprising:
    pouring a selected beverage responsive to user selection of an activation element on the beverage dispenser;
    receiving a handshake request from a mobile device of a user;
    establish a communications link with the mobile device; and
    responsive to receiving control data associated with user activation of a pour button corresponding with the activation element on a user interface of the mobile device, causing in a real-time manner a physical function to be performed by the beverage dispenser to pour a beverage while the pour button is held.

13. The method according to claim 12, further comprising dispensing an ingredient into a vessel of the user responsive to the control data.

14. The method according to claim 12, further comprising displaying an image associated with the user responsive to the control data.

15. The method according to claim 12, further comprising altering a user interface being displayed on an electronic device of the beverage dispenser.

16. The method according to claim 12, further comprising synchronizing a user interface on the beverage dispenser with a user interface being displayed on the mobile device.

17. The method according to claim 12, further comprising:
receiving second control data from a second mobile device of a second user in conjunction with a second beverage order;
storing the second control data; and
displaying data associated with the user of the second mobile device.

18. The method according to claim 12, wherein receiving the control data includes receiving the control data that is representative of the user touching or moving a finger on a particular location on the dispenser.

19. The method according to claim 18, wherein receiving the control data that is representative of the particular location associated with a physical button on the beverage dispenser, and further comprising causing a physical function be performed that corresponds to a physical function that would occur if the user were to press the physical button on the beverage dispenser.

20. The method according to claim 12, further comprising:
moving a graphical representation of a beverage indicia from a first electronic display to a second display in response to receiving the control data; and
causing a beverage associated with the beverage icon to be dispensed by the dispenser in response to a user interacting with the second display or hard-button associated therewith.

* * * * *